United States Patent
Braren

(10) Patent No.: US 12,409,874 B2
(45) Date of Patent: *Sep. 9, 2025

(54) SYSTEM AND METHOD FOR DETECTING AXLE BODY AND FILET CRACKS IN RAIL VEHICLES

(71) Applicant: BNSF Railway Company, Fort Worth, TX (US)

(72) Inventor: Hark Braren, Fort Worth, TX (US)

(73) Assignee: BNSF Railway Company, Fort Worth, TX (US)

( * ) Notice: Subject to any disclaimer, the term of this patent is extended or adjusted under 35 U.S.C. 154(b) by 110 days.

This patent is subject to a terminal disclaimer.

(21) Appl. No.: 18/354,456

(22) Filed: Jul. 18, 2023

(65) Prior Publication Data

US 2024/0092408 A1    Mar. 21, 2024

Related U.S. Application Data

(63) Continuation of application No. 17/933,549, filed on Sep. 20, 2022, now Pat. No. 11,713,064.

(51) Int. Cl.
  *G01C 1/00*       (2006.01)
  *B61L 27/57*     (2022.01)
  (Continued)

(52) U.S. Cl.
  CPC .......... *B61L 27/57* (2022.01); *G01B 11/2755* (2013.01); *B61L 27/40* (2022.01)

(58) Field of Classification Search
  CPC ....... B61L 27/57; B61L 27/40; G01B 11/2755
  See application file for complete search history.

(56) References Cited

U.S. PATENT DOCUMENTS

| 4,745,469 A | 5/1988 | Waldecker et al. |
| 9,340,219 B2 | 5/2016 | Gamache et al. |

(Continued)

FOREIGN PATENT DOCUMENTS

| CN | 101178305 B | * 6/2011 | ........... G01B 11/275 |
| CN | 106813599 B | * 12/2018 | ........... G01B 11/275 |

(Continued)

OTHER PUBLICATIONS

Matthias Asplund, Wayside Condition Monitoring System for Railway Wheel Profiles: Applications and Performance Assessment, Dec. 31, 2016.

(Continued)

*Primary Examiner* — Mark Hellner
(74) *Attorney, Agent, or Firm* — Whitaker Chalk Swindle & Schwartz PLLC; Enrique Sanchez, Jr.; Juan Vasquez

(57) ABSTRACT

Methods and systems for in-service inspection of freight car axles are provided. A camber angle of a wheel attached to a target axle is measured at one or more points in a revolution of the wheel. A determination of whether a defect is present in the target axle is made based on the measured camber angle at the one or more points in the revolution of the wheel. A determination that a defect is present in the target axle is made when a camber angle of the wheel at one or more points in the revolution of the wheel exceeds a threshold, and/or a determination that a defect is not present is made when no camber angle of the wheel at any point in the revolution of the wheel exceeds the predetermined threshold. An alert is generated in response to determining that a defect is present.

18 Claims, 11 Drawing Sheets

(51) Int. Cl.
    *G01B 11/275*     (2006.01)
    *B61L 27/40*     (2022.01)

(56)          References Cited

U.S. PATENT DOCUMENTS

| | | |
|---|---|---|
| 9,922,416 B2 | 3/2018 | Mian et al. |
| 11,713,064 B1 * | 8/2023 | Braren .................. B61L 27/57 |
| | | 356/139.09 |
| 2013/0313372 A1 | 11/2013 | Gamache et al. |
| 2015/0241312 A1 * | 8/2015 | Santanera ............. G01B 11/22 |
| | | 73/146 |
| 2018/0237041 A1 | 8/2018 | Mesher |
| 2020/0408682 A1 | 12/2020 | Mian et al. |

FOREIGN PATENT DOCUMENTS

| | | | |
|---|---|---|---|
| EP | 0280941 B1 | 11/1992 | |
| EP | 1600351 B1 | 1/2007 | |
| EP | 2402227 B1 | 3/2018 | |
| EP | 2853879 B1 * | 4/2020 | ............... B61K 9/00 |

OTHER PUBLICATIONS

Zheng Gong, Junhua Sun, and Guangjun Zhang, Dynamic Measurement for the Diameter of A Train Wheel Based on Structured-Light Vision, Apr. 20, 2016.

* cited by examiner

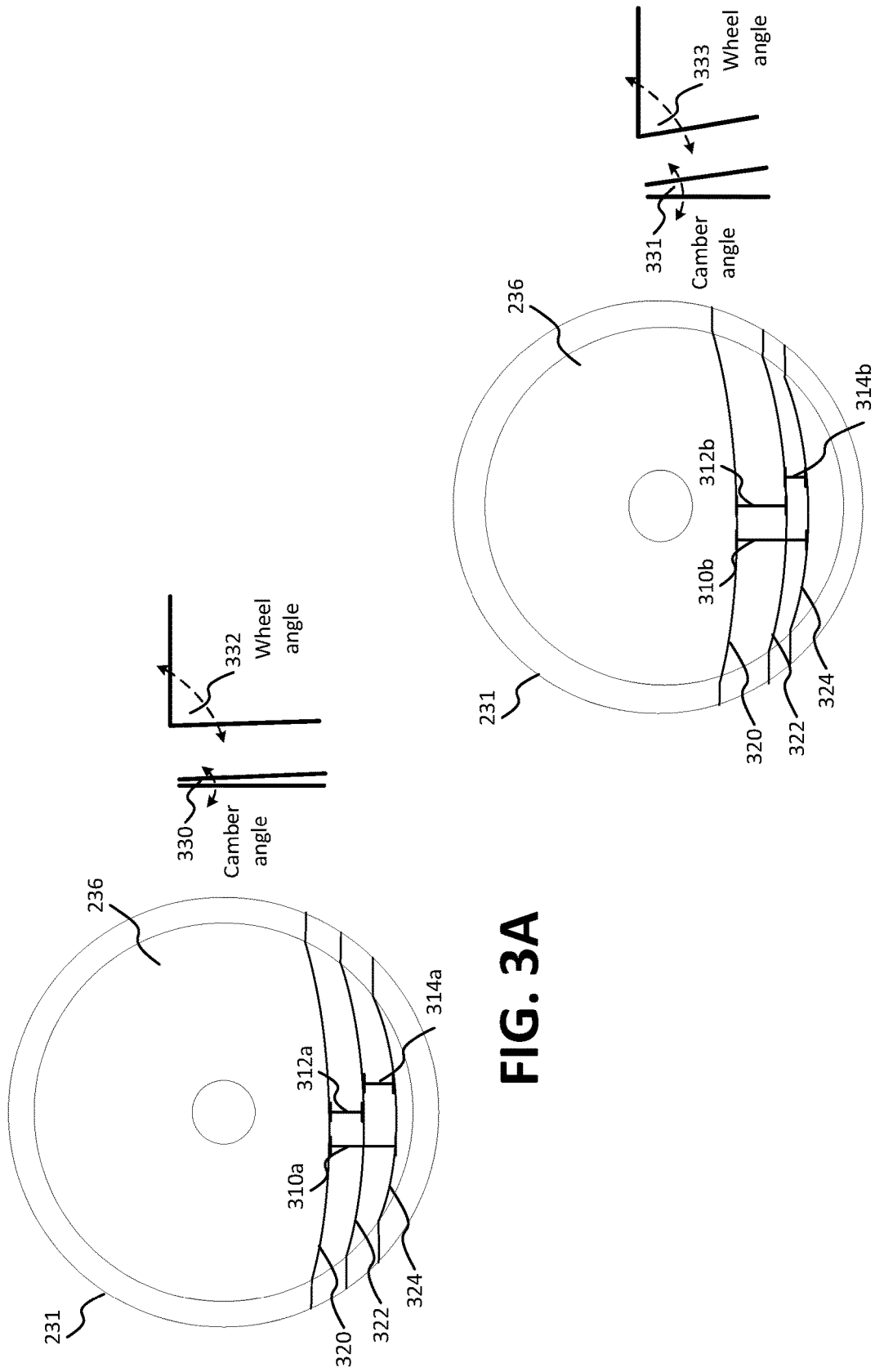

SYSTEM AND METHOD FOR DETECTING AXLE BODY AND FILET CRACKS IN RAIL VEHICLES

CROSS-REFERENCE TO RELATED APPLICATIONS

The present application is a Continuation Application of U.S. patent application Ser. No. 17/933,549, filed Sep. 20, 2022, the contents of which are incorporated herein in their entirety for all purposes.

TECHNICAL FIELD

The present invention relates generally to defect detection in physical components, and more particularly to techniques for detecting defects on freight car axles while in-service.

BACKGROUND

Every day, freight is transported using a combination of transportation modes, such as ships, aircraft, train, and trucks. Trains, in particular, allow us to move large amounts of materials, objects, and/or persons for long distances for a relatively cheap price. A train is a wonderful invention, and a typical train includes a locomotive engine providing power to move train cars attached thereto over a railroad track. A typical train car consists of a body (e.g., a container, platform, passenger car, etc.) which sits atop a chassis. The chassis includes various components that enable the train car to be pulled or pushed over a railroad car. Of note, the chassis includes several wheelsets, each of which includes a pair of wheels attached to each via an axle.

A typical wheelset is strong, durable, and well designed, the result of many years of engineering experience and development. Nonetheless, given the importance of freight transportation and the significant economic losses and casualties that can occur when a wheelset fails, wheelsets are inspected at regular intervals for defects. As a typical wheelset consists mainly of metal components, cracks, metal fatigue, and/or other defects are of special interest when inspecting a wheelset. A particular vulnerable component of a wheelset is the axle, which typically consists of an axle body (e.g., the portion of the axle between the two wheels), the wheel mounts (e.g., the portion of the axle to which the wheels are mounted), a journal at each end of the axle (e.g., the outermost portions of the axle to which the bearings are mounted), and the journal filet (e.g., the portion of the axle where the diameter of the axle transitions from the larger diameter of the wheel mounts to the smaller diameter of the journal).

An axle failure is almost always disastrous and, depending on the speed of the train and/or the weight of the load at the time of the failure, is typically catastrophic and significantly expensive. Axle failures may come in different varieties, but two particular in-service failures include axle body failures and journal filet failures. These two failures are caused by defects, typically cracks on the respective components. For example, a crack on a journal filet may cause a failure of the journal filet, and a crack on an axle body may cause a failure of the axle body filet. The consequence of an axle failure is typically a derailment. However, currently, inspecting the axle body and/or the journal filet of a wheelset is a very labor intensive and costly process, as inspection of the axle often requires removal of the axle from the train car to be taken to an inspection shop to be inspected using specialized and expensive tools. Wayside, or in-service, inspection of the axle for journal filet or axle body defects is currently nearly impossible.

For example, reaching the axle body may require accessing the bottom portion of the train car, which may be difficult and oftentimes operators may not be inclined to go under train cars to visually inspect the axle bodies. Moreover, even when an operator may access the bottom of a train car to visually inspect the axle body, there may be a high likelihood that the operator may miss a defect if, for example, the defect in the axle body happens to be in a portion of the axle body that is oriented upward (e.g., in the twelve o'clock direction) at the time of the inspection, which may cause the defect to be hidden to the operator.

In-service inspection of the journal filet of an axle is even more difficult, as the journal filet is obscured by the roller bearing. Once the bearing is installed, detecting a crack in the journal filet is virtually impossible, as the journal filet is no longer accessible.

SUMMARY

The present disclosure achieves technical advantages as systems, methods, and computer-readable storage media that provide functionality for in-service inspection of freight car axles. The present disclosure provides for a system integrated into a practical application with meaningful limitations that may include measuring a camber angle of a wheel attached to a target axle (e.g., an axle under inspection) at at least one point in the revolution of the wheel, determining whether a defect is present in the target axle based on the camber angle of the wheel at the at least one point in the revolution of the wheel, and generating an alert in response to a determination that a defect is present in the target axle. In embodiments, a determination that a defect is present in the target axle may be made in response to a determination that a camber angle of the wheel at the at least one point in the revolution of the wheel exceeds a threshold, and/or a determination that a defect is not present may be made in response to a determination that no camber angle of the wheel at any point in the revolution of the wheel exceeds the predetermined threshold. In embodiments, measuring the camber angle of the wheel at the at least one point in the revolution of the wheel may include projecting a plurality of lines onto a surface of the wheel at the at least one point in the revolution of the wheel, measuring a distance between one or more combinations of the plurality of lines projected onto the surface of the wheel, and determining the camber angle of the wheel at the at least one point in the revolution of the wheel based, at least in part, on the distance between the one or more combinations of the plurality of lines projected onto the surface of the wheel. In alternative or additional embodiments, measuring the camber angle of the wheel at the at least one point in the revolution of the wheel may include transmitting, from a projector, each of a plurality of range finding beams onto a different point of a surface of the wheel at the at least one point in the revolution of the wheel about the target axle, measuring a distance between the projector and each of the different points of the surface of the wheel onto which each of the plurality of range finding beams are transmitted, and determining the camber angle of the wheel at the at least one point in the revolution of the wheel based, at least in part, on the distance between the projector and each of the different points of the surface of the wheel onto which each of the plurality of range finding beams are transmitted.

The present disclosure solves the technological problem of a lack of technical functionality to inspect freight car axles while in-service by providing methods and system that provide a novel and inventive mechanism to inspect freight car axles while in-service. The technological solutions provided herein, and missing from conventional systems, are more than a mere application of a manual process to a computerized environment, but rather include functionality to implement a technical process to supplement current manual solutions for freight car axle inspections by enabling in-service inspections, which currently not possible. In doing so, the present disclosure goes well beyond a mere application the manual process to a computer. For example, the present disclosure provides solutions that include implementing functionality to measure the camber angle of a wheel attached to the target axle at at least one point in the revolution of the wheel and to determine whether there is a defect in the target axle based on the camber angle of the wheel measured at the at least one point in the revolution of the wheel.

Accordingly, the present disclosure discloses concepts inextricably tied to computer technology such that the present disclosure provides the technological benefit of implementing functionality to inspect freight car axles while in-service. The systems and techniques of embodiments provide improved systems by providing capabilities to perform functions that are currently extremely costly (e.g., freight car axles inspections), and to perform functions that are currently not possible (e.g., in-service freight car axles inspections).

It is an object of the invention to provide a system for in-service inspection of freight car axles. It is a further object of the invention to provide a method of in-service inspection of freight car axles. It is still a further object of the invention to provide a computer-based tool for in-service inspection of freight car axles. These and other objects are provided by the present disclosure, including at least the following embodiments.

In one particular embodiment, a method of detecting a presence of a defect in a target axle of a freight car wheelset in-service is provided. The method includes transmitting, from a projector, a plurality of range finding beams onto a surface of a wheel attached to the target axle at at least one point in a revolution of the wheel. In embodiments, each of the plurality of range finding beams may be projected onto a different point on the surface of the wheel. The method also includes measuring a distance between the projector and each of the different points on the surface of the wheel onto which each of the plurality of range finding beams is projected, determining a camber angle of the wheel at the at least one point in a revolution of the wheel based, at least in part, on the measured distance between the projector and each of the different points on the surface of the wheel onto which each of the plurality of range finding beams is projected, determining whether a defect is present in the target axle based on the camber angle of the wheel at the at least one point in a revolution of the wheel, and transmitting an alert in response to a determination that the defect is present in the target axle.

In another embodiment, a method of detecting a presence of a defect in a target axle of a freight car wheelset in-service is provided. The method includes projecting a plurality of lines onto a surface of a wheel attached to the target axle at at least one point in a revolution of the wheel, measuring a distance between a first line of the plurality of lines and a second line of the plurality of lines, determining a camber angle of the wheel at the at least one point in a revolution of the wheel based, at least in part, on the measured distance between a first line of the plurality of lines and a second line of the plurality of lines, determining whether a defect is present in the target axle based on the camber angle of the wheel at the at least one point in a revolution of the wheel, and transmitting an alert in response to a determination that the defect is present in the target axle.

In yet another embodiment, a method of detecting a presence of a defect in a target axle of a freight car wheelset in-service is provided. The method includes measuring a camber angle of a wheel attached to the target axle at each point of a plurality of points in a revolution of the wheel around the target axle, determining whether a defect is present in the target axle based on the camber angle of the wheel at each point of the plurality of points in the revolution of the wheel around the target axle, and transmitting an alert in response to a determination that the defect is present in the target axle.

In still another embodiment, a computer-based tool for detecting a presence of a defect in a target axle of a freight car wheelset in-service is provided. The computer-based tool may include non-transitory computer readable media having stored thereon computer code which, when executed by a processor, causes a computing device to perform operations. The operations include transmitting, from a projector, a plurality of range finding beams onto a surface of a wheel attached to the target axle at at least one point in a revolution of the wheel. In embodiments, each of the plurality of range finding beams may be projected onto a different point on the surface of the wheel. The operations also include measuring a distance between the projector and each of the different points on the surface of the wheel onto which each of the plurality of range finding beams is projected, determining a camber angle of the wheel at the at least one point in a revolution of the wheel based, at least in part, on the measured distance between the projector and each of the different points on the surface of the wheel onto which each of the plurality of range finding beams is projected, determining whether a defect is present in the target axle based on the camber angle of the wheel at the at least one point in a revolution of the wheel, and transmitting an alert in response to a determination that the defect is present in the target axle.

In yet another embodiment, a computer-based tool for detecting a presence of a defect in a target axle of a freight car wheelset in-service is provided. The computer-based tool may include non-transitory computer readable media having stored thereon computer code which, when executed by a processor, causes a computing device to perform operations. The operations include projecting a plurality of lines onto a surface of a wheel attached to the target axle at at least one point in a revolution of the wheel, measuring a distance between a first line of the plurality of lines and a second line of the plurality of lines, determining a camber angle of the wheel at the at least one point in a revolution of the wheel based, at least in part, on the measured distance between a first line of the plurality of lines and a second line of the plurality of lines, determining whether a defect is present in the target axle based on the camber angle of the wheel at the at least one point in a revolution of the wheel, and transmitting an alert in response to a determination that the defect is present in the target axle.

In yet another embodiment, a computer-based tool for detecting a presence of a defect in a target axle of a freight car wheelset in-service is provided. The computer-based tool may include non-transitory computer readable media having stored thereon computer code which, when executed by a processor, causes a computing device to perform operations. The operations include measuring a camber angle of a wheel attached to the target axle at each point of a plurality of points in a revolution of the wheel around the target axle, determining whether a defect is present in the target axle based on the camber angle of the wheel at each point of the plurality of points in the revolution of the wheel around the target axle, and transmitting an alert in response to a determination that the defect is present in the target axle.

In still another embodiment, a system for in-service inspection of freight car axles is provided is provided. The system comprises at least one processor and a memory operably coupled to the at least one processor and storing processor-readable code that, when executed by the at least one processor, is configured to perform operations. The operations include transmitting, from a projector, a plurality of range finding beams onto a surface of a wheel attached to the target axle at at least one point in a revolution of the wheel. In embodiments, each of the plurality of range finding beams may be projected onto a different point on the surface of the wheel. The operations also include measuring a distance between the projector and each of the different points on the surface of the wheel onto which each of the plurality of range finding beams is projected, determining a camber angle of the wheel at the at least one point in a revolution of the wheel based, at least in part, on the measured distance between the projector and each of the different points on the surface of the wheel onto which each of the plurality of range finding beams is projected, determining whether a defect is present in the target axle based on the camber angle of the wheel at the at least one point in a revolution of the wheel, and transmitting an alert in response to a determination that the defect is present in the target axle.

In yet another embodiment, a system for in-service inspection of freight car axles is provided is provided. The system comprises at least one processor and a memory operably coupled to the at least one processor and storing processor-readable code that, when executed by the at least one processor, is configured to perform operations. The operations include projecting a plurality of lines onto a surface of a wheel attached to the target axle at at least one point in a revolution of the wheel, measuring a distance between a first line of the plurality of lines and a second line of the plurality of lines, determining a camber angle of the wheel at the at least one point in a revolution of the wheel based, at least in part, on the measured distance between a first line of the plurality of lines and a second line of the plurality of lines, determining whether a defect is present in the target axle based on the camber angle of the wheel at the at least one point in a revolution of the wheel, and transmitting an alert in response to a determination that the defect is present in the target axle.

In yet another embodiment, a system for in-service inspection of freight car axles is provided is provided. The system comprises at least one processor and a memory operably coupled to the at least one processor and storing processor-readable code that, when executed by the at least one processor, is configured to perform operations. The operations include measuring a camber angle of a wheel attached to the target axle at each point of a plurality of points in a revolution of the wheel around the target axle, determining whether a defect is present in the target axle based on the camber angle of the wheel at each point of the plurality of points in the revolution of the wheel around the target axle, and transmitting an alert in response to a determination that the defect is present in the target axle.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 3A illustrates an example of measurements of a camber angle of a wheel of a wheelset by projection of at least one line onto a surface of the wheel at one point in a revolution of the wheel in accordance with embodiments of the present disclosure;

FIG. 3B illustrates an example of measurements of a camber angle of a wheel of a wheelset by projection of at least one line onto a surface of the wheel at another point in the revolution of the wheel in accordance with embodiments of the present disclosure;

Figure 1:
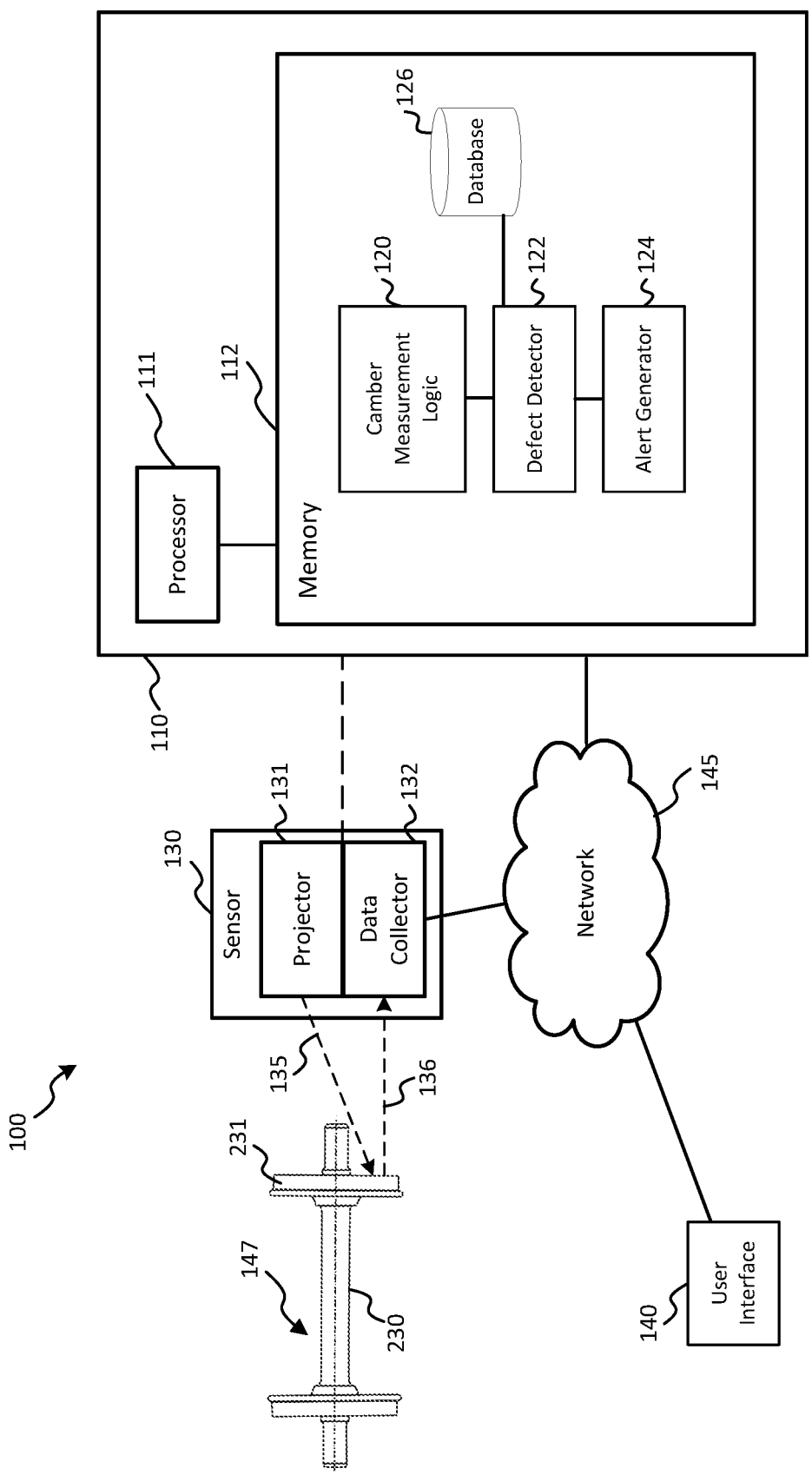
FIG. 1 is a block diagram of an exemplary system 100 configured with capabilities and functionality for in-service inspection of freight car axles in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to systems and techniques that provide functionality for in-service inspection of freight car axles. In particular embodiments, a camber angle of a wheel attached to a target axle (e.g., an axle under inspection) may be measured at at least one point in the revolution of the wheel about an axis of the target axle. In embodiments, measuring the camber angle of the wheel at the at least one point in the revolution of the wheel may include projecting a plurality of lines onto a surface of the wheel at a first point in a revolution of the wheel about the target axle, measuring a distance between one or more combinations of the plurality of lines projected onto the surface of the wheel, and determining the camber angle of the wheel at the first point in the revolution of the wheel based, at least in part, on the distance between the one or more combinations of the plurality of lines projected onto the surface of the wheel. In alternative or additional embodiments, measuring the camber angle of the wheel at the at least one point in the revolution of the wheel may include transmitting, from a projector, each of a plurality of range finding beams onto a different point of a surface of the wheel at a first point in a revolution of the wheel about the target axle, measuring a distance between the projector and each of the different points of the surface of the wheel onto which each of the plurality of range finding beams are transmitted, and determining the camber angle of the wheel at the first point in the revolution of the wheel based, at least in part, on the distance between the projector and each of the different points of the surface of the wheel onto which each of the plurality of range finding beams are transmitted. In some embodiments, the lines technique and the range finding beams technique described above may be used in combination, where a first technique (e.g., the lines technique and the range finding beams technique) may be used to measure a camber angle at the at least one point in the revolution of the wheel and a second technique (e.g., the lines technique and the range finding beams technique) may be used to verify the camber angle measurements obtained using the first technique.

In one or more embodiments, a determination may be made as to whether a defect is present in the target axle based on the camber angle of the wheel measured at the at least one point in the revolution of the wheel. In one or more embodiments, an alert may be generated in response to a determination that a defect is present in the target axle. In one or more embodiments, the measurement device can be disposed proximate the rail. For example, the device can be positioned on the field-side of the rail, the gauge-side of the rail, or both. The systems and methods disclosed herein are operable on either side of the rail.

In one or more embodiments, an "in-service" inspection, or a wayside inspection, of a freight car target axle may refer to an inspection of the target axle that is performed while the freight car is in operation, such as when the freight car is moving over a railroad track. For example, embodiments of the present disclosure may provide techniques for inspecting axles while in-service without requiring the axles to be removed to a shop and may allow for inspection of the axles while the freight car is in operation, such as while the freight car is part of a train and being pulled or pushed over railroad tracks.

In one or more embodiments, a "target axle" may refer an axle under inspection, such as to determine whether there are any defects in the axle. In particular, a target axle may refer to an axle whose axle body and/or journal filet are under inspection in accordance with embodiments of the present disclosure.

In one or more embodiments, a "wheel angle" of a wheel may refer to the angle between the vertical axis of the wheel and a longitudinal axis running through the axis to which the wheel is attached. In one or more embodiments, a "camber angle" of a wheel may refer to the angle between the vertical axis that is normal to the plane on which the railroad track is disposed and the axis running vertically through the wheel. Further details related to wheel angles and camber angles will be discussed below.

FIG. 1 is a block diagram of an exemplary system 100 configured with capabilities and functionality for in-service inspection of freight car axles in accordance with embodiments of the present disclosure. As shown in FIG. 1, system 100 may include server 110, sensor 130, network 145, and user interface 140. These components, and their individual components, may cooperatively operate to provide functionality in accordance with the discussion herein. For example, in operation according to embodiments, sensor 130 may operate to collect data associated with a camber angle of a wheel, such as wheel 231 attached to axle 230 of wheelset 147, at at least one point in a revolution of wheel 231 while wheelset 147 is in-service. Functionality of server 110 may operate to measure, based on the data associated with the camber angle of wheel 231 collected by sensor 130 at the at least one point in a revolution of wheel 231, the camber angle of wheel 231 at the at least one point in a revolution of wheel 231, and to determine whether a defect is present in target axle 230 based on the measured camber angle of wheel 231 at the at least one point in a revolution of wheel 231. Functionality of server 110 may operate to generate an alert in response to a determination that a defect is present in target axle 147. In embodiments, the alert may be transmitted and received by a user interface, e.g., user interface 140. Corrective action, such as in-depth inspections, replacements, repairs, etc., may be taken with respect to target axle 230 in response to the alert.

Figure 2A:
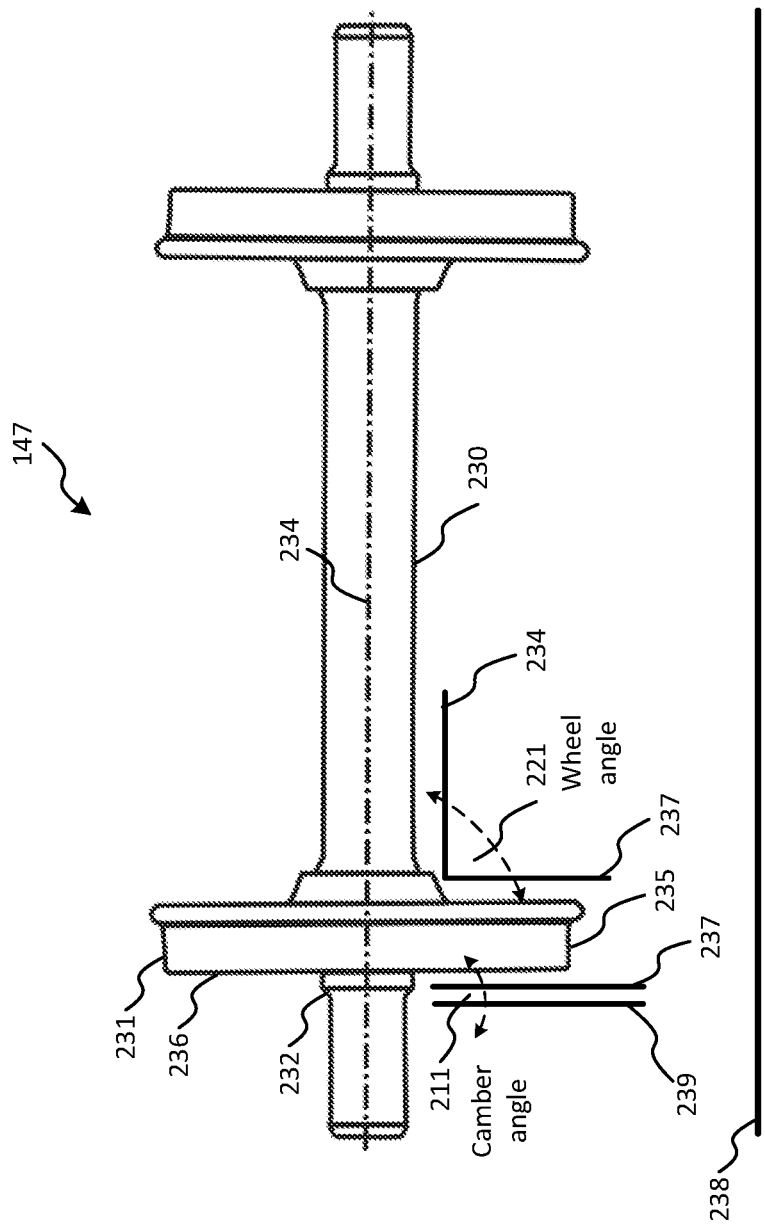
FIG. 2A illustrates an example of a wheelset with wheels attached to an axle without a defect.

FIGS. 2A-2D illustrate examples of a camber angle of a wheel during a revolution affected by a defect in the axle to which the wheel is attached. FIG. 2A illustrates an example of wheelset 147 with wheels 231 attached to axle 230 without a defect. In this example, axle 230 may not be defective. For example, axle 230 may not have a crack within its body or at journal filet 232. In some implementations, axle 230 may be designed to withstand cracks of up to 50% without failing. Ideally, wheel 231 may be attached to axle 230 at a right angle, such that a wheel vertical axis 237 of wheel 231 forms a right angle with the longitudinal axis 234 running through axle 230. In this case, wheel angle 221 may be formed by the angle between wheel vertical axis 237 of wheel 231 and longitudinal axis 234 of axle 230. In this ideal example, wheel angle 221 may be ninety degrees. Camber angle 211 may be formed by the angle between wheel vertical axis 237 and vertical axis 239, vertical axis 239 being an axis that is normal to plane 238 on which the railroad track to which wheel 231 attaches during operations is disposed. In this ideal example, camber angle 211 may be zero degrees, as wheel 231 may be attached to axis 230 at a perfect ninety degrees angle.

Figure 2B:
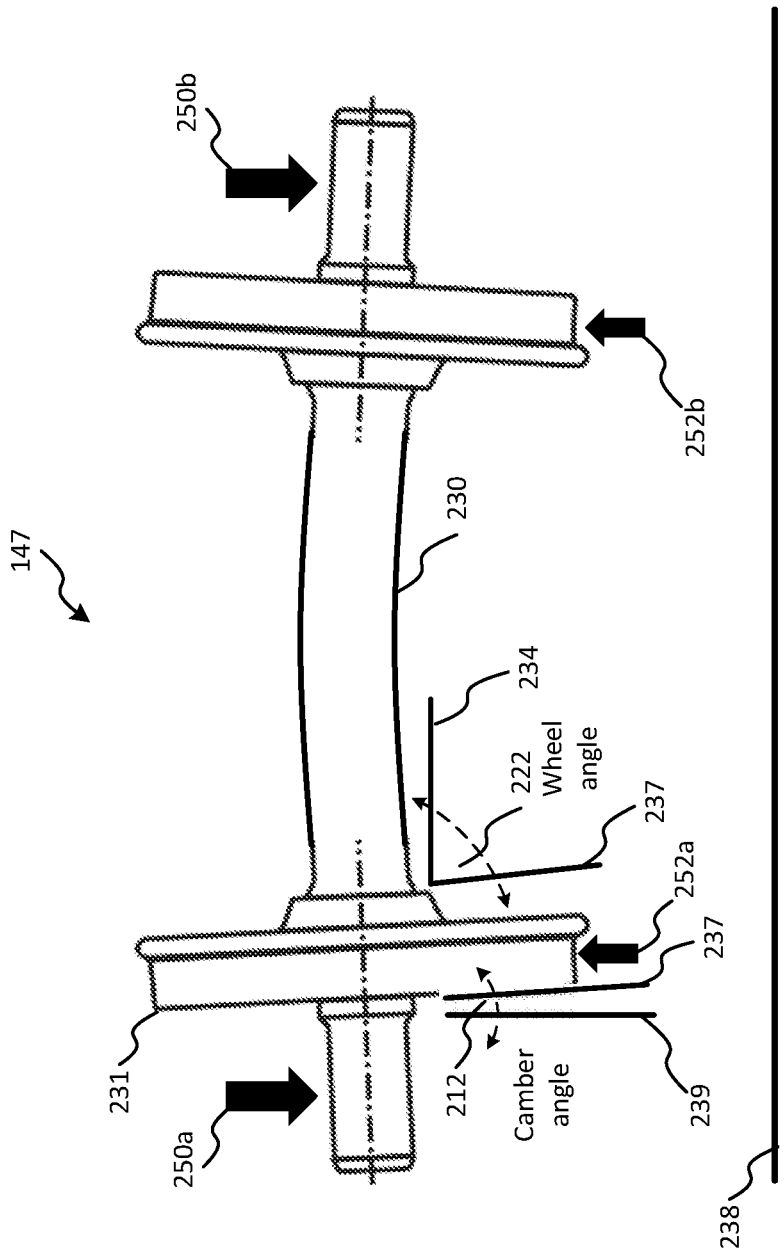
FIG. 2B illustrates an example of a wheelset during normal operations.

However, typically, a wheel is not attached to the axle at a perfect ninety degrees due to imperfections in manufacturing and due to acceptable tolerances. Furthermore, during operations, such as when wheelset 147 is in-service, load forces acting upon axle 230, upward forces acting upon wheel 231 (e.g., from the railroad track), and even imperfections in the railroad track or on the wheel sides 235 (which contact the railroad track during operations), may cause axle 230 to flex or bend, which may further affect the wheel angle and the camber angle of wheel 231. For example, FIG. 2B illustrates an example of wheelset 147 during normal operations. As seen in FIG. 2B, load forces 250a and 250b may act upon axle 230 of wheelset 147, pushing axle 230 downwards. At the same time, upward forces 252a and 252b from the railroad track may act in an upward direction against wheel 231. These forces may cause a flexing or bending of axle 230, which may cause wheel 231 to rotate in a manner as to increase the camber angle of wheel 231. In this example, wheel 231 may have a camber angle 212. Similarly, the wheel angle between wheel vertical axis 237 of wheel 231 and longitudinal axis 234 of axle 230 may decrease.

Figure 2C:
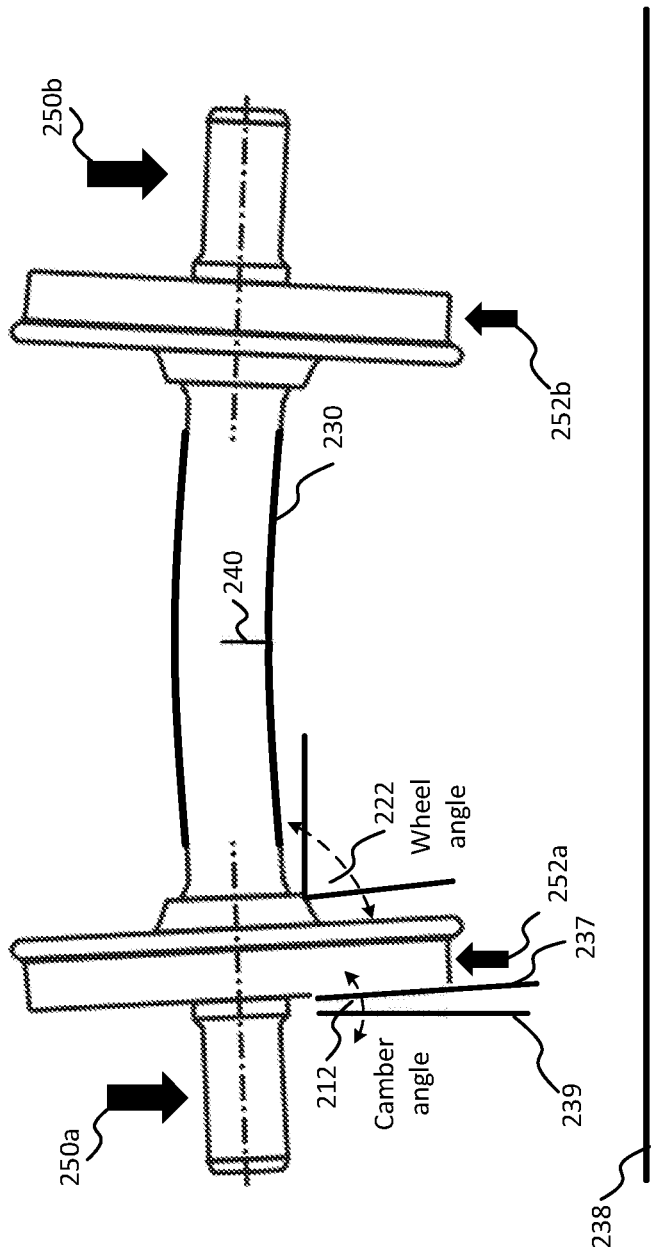
FIG. 2C illustrates an example of a wheelset with an axle with a defect present and rotationally oriented in the bottom half of the axle.

The camber angle of a wheel can be affected by a defect in the axle to which the wheel is attached. FIG. 2B illustrates an example of wheelset 147 during normal operations FIG. 2C illustrates an example of wheelset 147 with an axle with a defect present in the bottom half of the axle. As seen in FIG. 2C, defect 240 may be present in axle 230. The camber angle of a wheel may not only be affected by the presence of a defect in the axle to which the wheel is attached, but also by the rotational position of the defect within the rotation of the axle. For example, in in FIG. 2C, defect 240 may be rotationally positioned in the bottom half of axle 230. That is, defect 240 is positioned between the three and nine o'clock positions, within the bottom half, and in this example, defect 240 is rotationally positioned at the six o'clock position. In this example, as axle 230 is rotated, defect 240 may change its rotational position. For example, if axle 230 is rotated ninety degrees clockwise, defect 240 may end up in a rotationally position at the nine o'clock position.

In one or more embodiments, when a defect of an axle is rotationally positioned in the bottom half of an axle, the camber angle of a wheel attached to the axle may not be measurably affected. For example, in the example illustrated in FIG. 2C, defect 240 may not have a measurable effect on the camber angle of wheel 231, in which case the camber angle is camber angle 212, which may be equal to the camber angle in the example of FIG. 2B in which no defect was present in axle 230. However, in one or more embodiments, when a defect of an axle is rotationally positioned in the top half of an axle, the camber angle of a wheel attached to the axle is measurably affected.

Figure 2D:
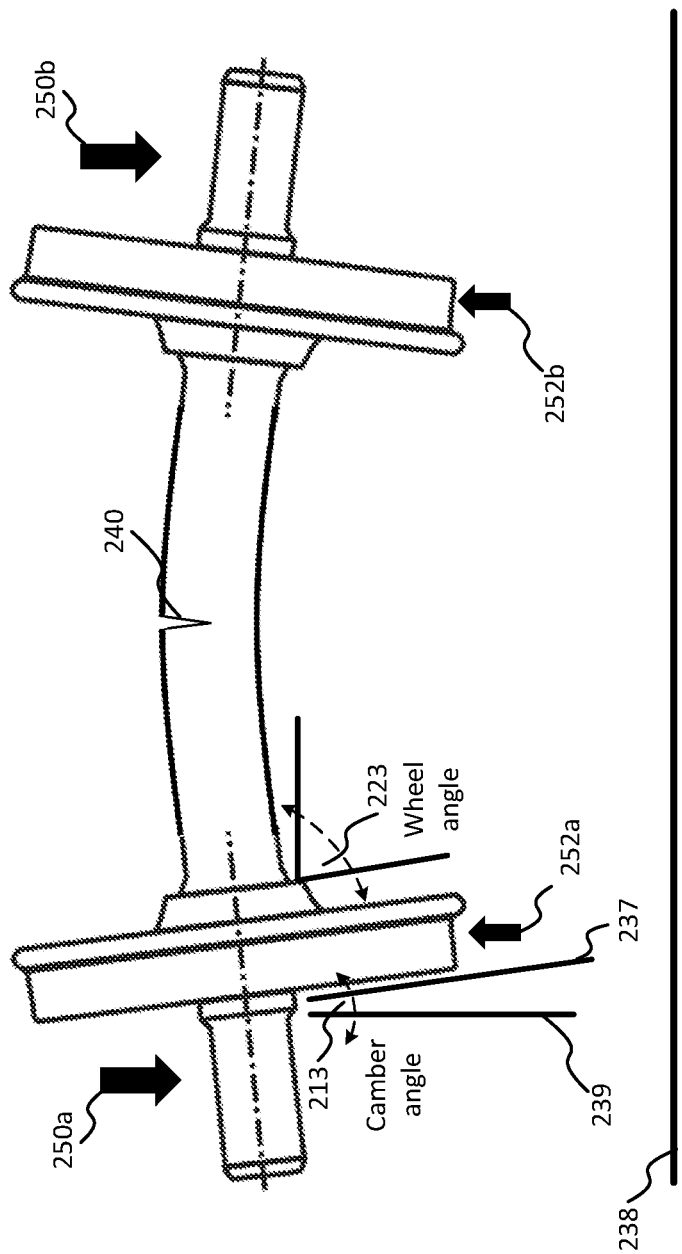
FIG. 2D illustrates an example of a wheelset with an axle with a defect present and rotationally oriented in the top half of the axle.

FIG. 2D illustrates an example of wheelset 147 with an axle with a defect present in the top half of the axle. As seen in FIG. 2D, defect 240 may be rotationally positioned in the top half of axle 230. That is, defect 240 is positioned between the three and nine o'clock positions, within the top half, and in this example, defect 240 is rotationally positioned at the twelve o'clock position. In this example, if axle 230 is rotated ninety degrees clockwise, defect 240 may end up in a rotationally position at the 3 o'clock position. As noted above, when a defect of an axle is rotationally positioned in the top half of an axle, the camber angle of a wheel attached to the axle can be measurably affected. For example, in the example illustrated in FIG. 2D, defect 240 may affect the camber angle of wheel 231, in which case the camber angle may increase to camber angle 213, which may be larger than the camber angle in the example of FIG. 2B in which no defect was present in axle 230, or the camber angle in the example of FIG. 2C in which defect 240 was rotationally positioned in the bottom half of axle 230. In this manner, by detecting and measuring the camber angle of a wheel attached to a target axle at different points in the revolution of the wheel, embodiments of the present disclosure may provide functionality to detect whether a defect is present in the target axle.

With reference back to FIG. 1, it is noted that, although the discussion that follows focuses on an in-service inspection of a target axle (e.g., target axle 230) in which measurement and determination of a camber angle is performed with respect to one wheel (e.g., wheel 231) of the wheels attached to target axle, this is done for illustrative purposes and should not be construed as limiting in any way. In embodiments, the in-service inspection may include performing measurements, such as determining the camber angle, of other wheels also attached to target axle 230. In these cases, the additional measurements (e.g., the camber measurements of the other wheels also attached to target axle 230) may be used to verify the results of the measurements performed with respect to wheel 231, or may be combined (e.g., by averaging) with the measurements performed with respect to wheel 231, to obtain overall results.

It is noted that the functional blocks, and components thereof, of system 100 of embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally, or alternatively, when implemented in software, one or more of the functional blocks, or some portion thereof, may comprise code segments operable upon a processor to provide logic for performing the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such embodiments, the functionality of each respective component may be aggregated from the functionality of multiple modules residing in a single, or in multiple devices.

It is further noted that functionalities described with reference to each of the different functional blocks of system 100 described herein is provided for purposes of illustration, rather than by way of limitation and that functionalities described as being provided by different functional blocks may be combined into a single component or may be provided via computing resources disposed in a cloud-based environment accessible over a network, such as one of network 145.

User terminal 140 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. In embodiments, user terminal 140 may be configured to provide an interface (e.g., a graphical user interface (GUI)) structured to facilitate an operator interacting with system 100, e.g., via network 145, to execute and leverage the features provided by server 110. In embodiments, the operator may be enabled, e.g., through the functionality of user terminal 140, to provide configuration parameters that may be used by system 100 to provide functionality for inspecting target axle 230 while in-service. In embodiments, the configuration parameters may include wheel profiles, such as profiles including information that define the shape, layout, or configuration of wheels attached to target axle 230, which may be used by system 100 to determine whether a defect is present in target axle 230 or not. For example, in some cases, the profile of a wheel may be such that even when the wheel is not defective, under normal operations the wheel may have a normal camber angle, or camber angle range. In these cases, the wheel profile may be used by system 100 to determine whether a camber angle measurement of the wheel indicates that a defect is present in the target axle or not.

In embodiments, the functionality of user terminal 140 may include receiving alerts (e.g., alerts generated using the functionality of server 110). In embodiments, the alerts may be presented to an operator via the GIU of user terminal 140. The operator may be an operator of the train in which wheelset 147 is installed or may be different operator.

Sensor 130 may be configured to collect data associated with a camber angle of wheel 231 attached to target axle 230 of wheelset 147, at least one point in a revolution of wheel 231 while wheelset 147 is in-service, and to transmit or pass on the collected data to server 110 for further processing. For example, wheelset 147 may be installed on a train car and the train car may be traversing a railroad track. In embodiments, sensor 130 may be configured to collect data associated with a camber angle of wheel 231 at at least one point in a revolution of wheel 231 while the train in which wheelset 147 is traversing the railroad track. In some embodiments, sensor 130 may be installed on the periphery of the railroad track in which the train in which wheelset 147 is installed is traveling. For example, sensor 130 may be disposed on the side of the railroad track and may be positioned with a line-of-sight toward the railroad track such that sensor 130 is able to collect data associated with a camber angle at at least one point in a revolution of any wheel passing through the line-of-sight of sensor 130. In some embodiments, sensor 130 may be configured to detect a camber angle of a wheel with a resolution of at least 0.01 degrees, or even a higher resolution, which may aloe sensor 130 to detect changes in the camber angle of a wheel of at least plus or minus 0.01 degrees.

In some embodiments, the line-of-sight of sensor 130 is configured to ensure total coverage of at least one revolution of any wheel passing through visibility area of sensor 130. For example, while wheel 231 passes through the visibility area of sensor 130, the configuration of sensor 130 ensures that wheel 231 is visible to sensor 130 during an entire revolution of wheel 231. In this manner, sensor 130 may be configured to collect data associated with a camber angle of wheel 231 at any point of a revolution of wheel 231. In some embodiments, sensor 130 may be configured to collect data associated with a camber angle of wheel 231 at a plurality of points during the revolution of wheel 231. This functionality of sensor 130 to collect data associated with a camber angle of wheel 231 at any point of a revolution of wheel 231 is significant, as some axle defects can cause a change in the camber angle of a wheel attached to the defective axle when the defect is positioned in a particular orientation of the defective axle (e.g., when the defect is oriented on the top half of the axle), but no camber angle change when the defect is positioned in different orientations of the defective axle (e.g., when the defect is oriented on the bottom half of the axle). As such, the functionality of sensor 130 to collect data associated with a camber angle of wheel 231 at any point of a revolution of wheel 231 enables system 100 ensures detection of the camber angle change associated with the particular orientation of the axle, since the axle rotates at the same rate as the attached wheel, and since there is sensor coverage over the entire revolution of wheel 231.

In some embodiments, sensor 130 may include a single sensor with a sufficiently wide visibility area to ensure full coverage of an entire revolution of wheel 231. It is noted that in a typical configuration, an axle, and consequently a wheel attached to the axle, of a wheelset completes a revolution approximately every ten feet of linear travel, in which case, sensor 130 may be configured with a visibility area of approximately ten feet. In embodiments, sensor 130 may be configured to collect data associated with a camber angle of wheel 231 at any point in a revolution of wheel 231 continuously as wheel 231 passes through the visibility area of sensor 130. In some embodiments, sensor 130 may be configured to collect data associated with a camber angle of wheel 231 at different points during the revolution of wheel 231. For example, in some embodiments, sensor 130 may be configured to collect data associated with a camber angle of wheel 231 at least each quarter intervals of the revolution of wheel 231. In this manner, it may be ensured that data associated with a camber angle of wheel 231 may be collected while a defect, if present, may be oriented on the top half of target axle 230, may be collected. In some embodiments, sensor 130 may collect data associated with a camber angle of wheel 231 at more regular intervals than each quarter intervals of the revolution of wheel 231, such as each eight, sixteenth, etc. interval.

In some embodiments, sensor 130 may include a plurality of sensors which, in combination, include a sufficiently wide visibility area to ensure full coverage of an entire revolution of wheel 231. In these embodiments, each sensor of sensor 130 may be configured to collect data associated with a camber angle of wheel 231 at a different point during the revolution of wheel 231. For example, in some embodiments, the plurality of sensors of sensor 130 may be positioned side-by-side. In this case, each sensor of the plurality of sensors of sensor 130 may cover a different point in the revolution of wheel 231.

In embodiments, sensor 130 may include projector 131 and data collector 132. The cooperative functionality of projector 131 and data collector 132 may operate provide functionality for collecting data associated with a camber angle of wheel 231 at at least one point in a revolution of wheel 231. Projector 131 may be configured to project at least one object onto a surface of wheel 231 at at least one point of the revolution of wheel 231. In some embodiments, projector 131 may be configured with the capability to project at least one object onto the surface of wheel 231 at any point in the revolution of wheel 231. In some embodiments, projector 131 may have a wide field-of-view or may include a plurality of projectors, such that projector 131 may be configured to project the at least one object onto the surface of wheel 231 at any point in the revolution of wheel 231.

In embodiments, the at least one object may include at least one line. In these embodiments, projector 131 may be configured to project at least one line onto the surface of wheel 231. A line projected onto the surface of wheel 231 may follow the profile of the wheel. In some embodiments, the at least one line may include at least one laser line projected onto the surface of wheel 231. For example, FIGS. 3A and 3B illustrate examples of measurements of a camber angle of a wheel of a wheelset by projection of at least one line onto a surface of the wheel at different points in the revolution of the wheel in accordance with embodiments of the present disclosure. As shown in FIG. 3A, lines 320, 322, and 324 may be projected, such as by projector 131, onto surface 236 of wheel 231 at a first point in the revolution of wheel 231. It is noted that this first point in the revolution of wheel 231 may represent a point at which a defect present in the target axle to which wheel 231 may be attached may be oriented or positioned in such a direction (e.g., positioned in the bottom half oriented towards the bottom of the target axle) as to not affect the normal flexing of the target axle or as to not affect the camber angle of wheel 231 by more than a threshold amount. For example, camber angle 330 of wheel 231 at the first point in the revolution of wheel 231 may be a "normal" or "acceptable" camber angle. In this example, each of lines 320, 322, and 324 may be projected onto a different portion of surface 236 of wheel 231. In addition, each of lines 320, 322, and 324 may be projected at a particular distance from other lines. For example, line 320 may be projected at a distance 310a from line 324 and at a distance 312a from line 322. Line 322 may be projected at a distance 314a from line 324. In embodiments, the distances 310a, 312a, and 314a may be previously known distances or may be preconfigured distances. FIG. 3B shows an example of lines 320, 322, and 324 projected, such as by projector 131, onto surface 236 of wheel 231 at a second point in the revolution of wheel 231. It is noted that this second point in the revolution of wheel 231 may be different from the first point in the revolution of wheel 231 and may represent a point at which a defect present in the target axle to which wheel 231 may be attached may be oriented or positioned in such a direction (e.g., positioned in the top half oriented towards the top of the target axle) as to affect the normal flexing of the target axle or as to affect the camber angle of wheel 231 by more than a threshold amount. In this case, the rotation of the target axle and wheel 231 may move the defect to this orientation that may affect normal camber angle of wheel 231. For example, camber angle 331 of wheel 231 at the second point in the revolution of wheel 231 may be a camber angle deviation from a "normal" or "acceptable" camber angle by more than a predetermined threshold amount. Hence, in this example, the camber angle 331 of wheel 231 at the second point in the revolution of wheel 231 may be different than the camber angle 331 of wheel 231 at the first point in the revolution of wheel 231 (e.g., as illustrated in FIG. 3A). In this case, the distances between lines 320, 322, and 324 at the second point in the revolution of wheel 231 may be different from the distances between lines 320, 322, and 324 at the first point in the revolution of wheel 231 due to the different camber angle at each of the first and second points of the revolution of wheel 231. For example, as shown in FIG. 3B, at the second point in the revolution of wheel 231, line 320 may be projected at a distance 310b from line 324 and at a distance 312b from line 322. Line 322 may be projected at a distance 314b from line 324.

Figure 4A:
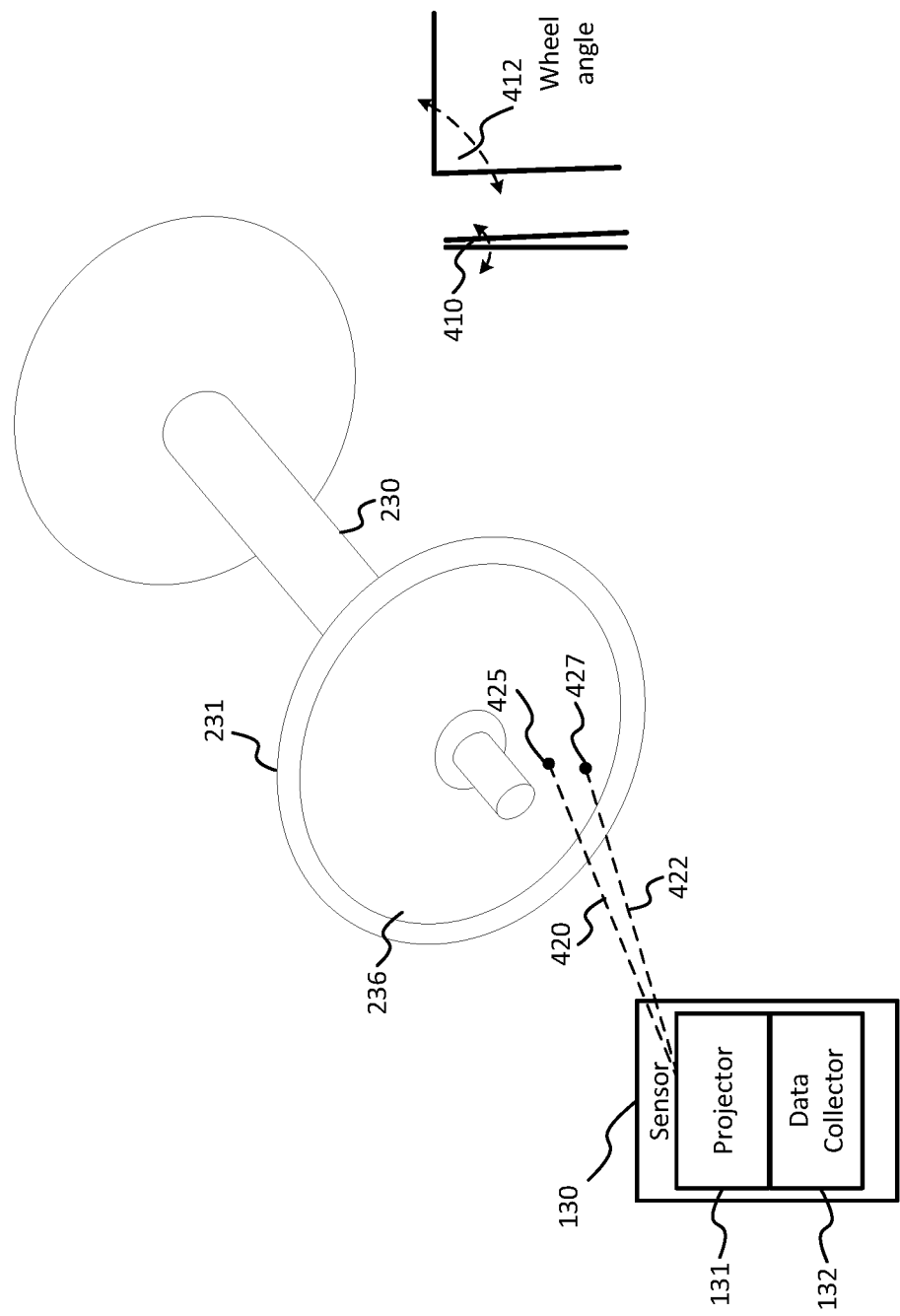
FIG. 4A illustrates an example of measurements of a camber angle of a wheel of a wheelset by projection of at least one range finding beam onto a surface of the wheel at a point in a revolution of the wheel in accordance with embodiments of the present disclosure.
Figure 4B:
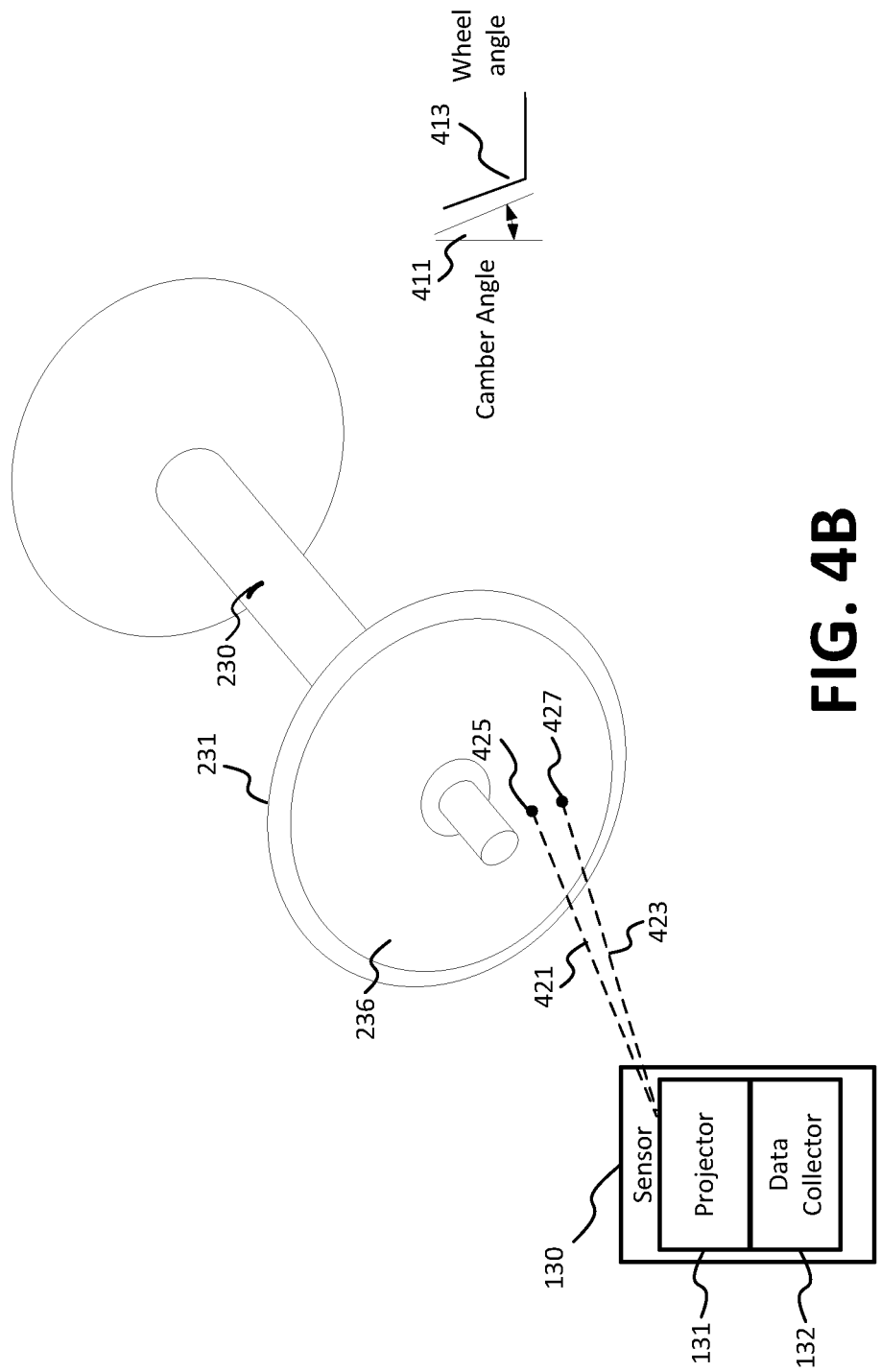
FIG. 4B illustrates an example of measurements of a camber angle of a wheel of a wheelset by projection of at least one range finding beam onto a surface of the wheel at another point in the revolution of the wheel in accordance with embodiments of the present disclosure.

In embodiments, the at least one object may include at least one range finding beam. In these embodiments, projector 131 may be configured to project at least one range finding beam onto the surface of wheel 231. In embodiments, each of the at least one range finding beam may projected onto a different point on the surface of wheel 231. For example, FIGS. 4A and 4B illustrate examples of measurements of a camber angle of a wheel of a wheelset by projection of at least one range finding beam onto a surface of the wheel at different points in the revolution of the wheel in accordance with embodiments of the present disclosure. As shown in FIG. 4A, a range finding beam may be transmitted from projector 131 and may be projected onto point 425 of surface 236 of wheel 231, and a range finding beam may be transmitted from projector 131 and may be projected onto point 427 of surface 236 of wheel 231 at a first point in the revolution of wheel 231. It is noted that this first point in the revolution of wheel 231 may represent a point at which a defect present in the target axle to which wheel 231 may be attached may be oriented or positioned in such a direction (e.g., positioned in the bottom half oriented towards the bottom of the target axle) as to not affect the normal flexing of the target axle or as to not affect the camber angle of wheel 231 by more than a threshold amount. For example, camber angle 410 of wheel 231 at the first point in the revolution of wheel 231 may be a "normal" or "acceptable" camber angle. In this example, point 425 may be a different point on surface 236 of wheel 231 from point 427. In some embodiments, the range finding beams may be projected onto point 425 and point 427 such that an imaginary line running through both points 425 and 427 is a vertical line with respect to the plane (e.g., plane 238 of FIG. 1) on which the railroad track to which wheel 231 attaches during operations is disposed. In embodiments, each of points 425 and 427 is a distance away from projector 131. For example, point 425 is at a distance 420 away from projector 131, and point 427 is a distance 422 away from projector 131. Put another way, the distance between projector 131 and point 425 onto which a first range finding beam is projected is distance 420, and the distance between projector 131 and point 427 onto which a second range finding beam is projected is distance 422. FIG. 4B shows an example of range finding beams transmitted from projector 131 and projected onto point 425 of surface 236 of wheel 231, and a range finding beam transmitted from projector 131 and projected onto point 427 of surface 236 of wheel 231 at a second point in the revolution of wheel 231. It is noted that this second point in the revolution of wheel 231 may be different from the first point in the revolution of wheel 231 and may represent a point at which a defect present in the target axle to which wheel 231 may be attached may be oriented or positioned in such a direction (e.g., positioned in the top half oriented towards the top of the target axle) as to affect the normal flexing of the target axle or as to affect the camber angle of wheel 231 by more than a threshold amount. For example, camber angle 411 of wheel 231 at the second point in the revolution of wheel 231 may be a camber angle deviation from a "normal" or "acceptable" camber angle by more than a predetermined threshold amount. Hence, in this example, the camber angle 411 of wheel 231 at the second point in the revolution of wheel 231 may be different than the camber angle 331 of wheel 231 at the first point in the revolution of wheel 231 (e.g., as illustrated in FIG. 4A). In this case, the distances between projector 131 and the points 425 and 427 at the second point in the revolution of wheel 231 may be different from the distances between projector 131 and the points 425 and 427 at the first point in the revolution of wheel 231 due to the different camber angle at each of the first and second points of the revolution of wheel 231. For example, as shown in FIG. 4B, at the second point in the revolution of wheel 231, the distance between projector 131 and point 425 onto which a first range finding beam is projected is distance 421, and the distance between projector 131 and point 427 onto which a second range finding beam is projected is distance 423

With reference back to FIG. 1, data collector 132 may be configured to collect measurements associated with the at least one object projected onto the surface of wheel 231 by projector 131 at the at least one point of the revolution of wheel 231. In embodiments, data collector 132 may be configured to collect measurements associated with objects projected onto the surface of wheel 231 by projector 131 at any point of the revolution of wheel 231. In some embodiments, data collector 132 may have a wide field-of-view such that data collector 132 may collect measurements associated with the at least one object projected onto the surface of wheel 231 at any and/or all points in the revolution of wheel 231. For example, in some embodiments, data collector 132 may have a visibility area of a size sufficient to collect measurement at any point in the revolution of wheel 231. In some embodiments, data collector 132 may include a plurality of data collectors which, in combination, may include a sufficiently wide visibility area to ensure full coverage of an entire revolution of wheel 231. In some embodiments, each projector of projector 131 may be associated with a data collector of data collector 132, such that a data collector of data collector 132 may collect measurements associated with at least one object projected onto the surface of wheel 231 by a projector corresponding to the data collector.

In embodiments, the measurements associated with the at least one object projected onto the surface of wheel 231 may include distance measurements, orientation angles, lengths, and/or any other measurement that can be used to determine a camber angle of wheel 231 at the time of the measurements are collected. For example, in embodiments in which the at least one object projected onto wheel 231 includes a plurality of lines, the measurements associated with the at least one object may include measurements of the distances between the projected lines of the plurality of lines. With reference to FIG. 3A, for example, a plurality of lines including lines 320, 322, and 324 may be projected onto different portion of surface 236 of wheel 231 by projector 131 at a first point of the revolution of wheel 231. As noted above, the first point in the revolution of wheel 231, as illustrated in FIG. 3A, may represent a point at which a defect present in the target axle to which wheel 231 may be attached may be oriented or positioned in such a direction as to not affect the normal flexing or normal camber angle of the target axle. At the first point in the revolution of wheel 231, the camber angle of wheel 231 may be camber angle 330. In this example, data collector 132 may be configured to measure, determine, obtain, or otherwise collect a measurement of the distance between one or more pairs of lines 320, 322, and 324. For example, data collector 132 may collect distance 310a as the distance between lines 320 and 324, distance 312a as the distance between lines 320 and 322, and distance 314a as the distance between lines 322 and 324. As also noted above, distances 310a, 312a, and 314a may represent normal distance measurements, as these measurements are collected at a point in which the camber angle of wheel 231 is not affected by a defect in the target axle (e.g., the defect of the target axle is oriented on the bottom half of the axle, or there may be no defect in the target axle). FIG. 3B, shows an example of lines 320, 322, and 324 being projected onto surface 236 of wheel 231 by projector 131 at a second point of the revolution of wheel 231. As noted above, the second point in the revolution of wheel 231, as illustrated in FIG. 3B, may represent a point at which a defect present in the target axle to which wheel 231 may be attached may be oriented or positioned in such a direction as to affect the normal flexing or normal camber angle of the target axle. For example, at the second point in the revolution of wheel 231, the camber angle of wheel 231 may be camber angle 332, which may be larger than camber angle 330 at the first point of the revolution of wheel 231. In this example, data collector 132 may collect distance 310b as the distance between lines 320 and 324, distance 312b as the distance between lines 320 and 322, and distance 314b as the distance between lines 322 and 324. In this case, one or more of distances 310b, 312b, and 314b may be different from respective distances 310a, 312a, and 314a (e.g., the normal distances), as these distances 310b, 312b, and 314b are collected at a point (e.g., the second point) in the revolution of wheel 231 at which the camber angle of wheel 231 is affected by a defect in the target axle (e.g., the defect of the target axle is oriented on the top half of the axle). Distances 310*a*, 312*a*, 314*a*, 310*b*, 312*b*, and/or 314*b* may be transmitted or passed on to server 110 for further processing. In some embodiments, data collector 132 may transmit the set of distances (e.g., a set of distance including distances between each line at a particular point in the revolution of wheel 231) including a maximum distance between lines in relation to all sets of distances collected (e.g., each set of distances corresponding to distances between each projected line at a different point in the revolution of wheel 231).

In embodiments in which the at least one object projected onto wheel 231 includes a plurality of range finding beams projected onto different points of the surface of wheel 231, the measurements associated with the at least one object may include measurements of the distances between the projector (e.g., projector 131) and each of the points onto which the different range finding beams may be projected. With reference to FIG. 4A, for example, a plurality of range finding beams may be transmitted from projector 131 and projected onto different points, such as point 425 and point 427 of surface 236 of wheel 231 at a first point of the revolution of wheel 231. As noted above, the first point in the revolution of wheel 231, as illustrated in FIG. 4A, may represent a point at which a defect present in the target axle to which wheel 231 may be attached may be oriented or positioned in such a direction as to not affect the normal flexing or normal camber angle of the target axle. At the first point in the revolution of wheel 231, the camber angle of wheel 231 may be camber angle 410. In this example, data collector 132 may be configured to measure, determine, obtain, or otherwise collect a measurement of the distance between projector 131 and each of points 425 and 427. For example, data collector 132 may detect a reflection of the range finding beam projected onto point 425 and may measure that the distance between projector 131 and point 425 is distance 420. In this example, data collector 132 may detect a reflection of the range finding beam projected onto point 427 and may measure that the distance between projector 131 and point 427 is distance 422. In this manner, projector 131 and data collector 132 may operate cooperatively to provide range sensing or range finding functionality. In this case, distances 420 and 422 may represent normal distance measurements, as these measurements are collected at a point in which the camber angle of wheel 231 is not affected by a defect in the target axle (e.g., the defect of the target axle is oriented on the bottom half of the axle, or there may be no defect in the target axle). FIG. 4B, shows an example of the plurality of range finding beams projected onto points 425 and 427 of surface 236 of wheel 231 at a second point of the revolution of wheel 231. The second point in the revolution of wheel 231, as illustrated in FIG. 4B, may represent a point at which a defect present in the target axle to which wheel 231 may be attached may be oriented or positioned in such a direction as to affect the normal flexing or normal camber angle of the target axle. For example, at the second point in the revolution of wheel 231, the camber angle of wheel 231 may be camber angle 411, which may be larger than camber angle 410 at the first point of the revolution of wheel 231. In this example, data collector 132 may detect a reflection of the range finding beam projected onto point 425 and may measure that the distance between projector 131 and point 425 is distance 421. Data collector 132 may detect a reflection of the range finding beam projected onto point 427 and may measure that the distance between projector 131 and point 427 is distance 423. In this case, one or more of distances 421 and 423 may be different from respective distances 420 and 422 (e.g., the normal distances), as these distances 421 and 423 are collected at a point (e.g., the second point) in the revolution of wheel 231 at which the camber angle of wheel 231 is affected by a defect in the target axle (e.g., the defect of the target axle is oriented on the top half of the axle). Distances 420, 421, 422, and 423 may be transmitted or passed on to server 110 for further processing. In some embodiments, data collector 132 may transmit the set of distances (e.g., a set of distance including distances between the projector and each point at which each of the range finding beams is projected at a particular point in the revolution of wheel 231) including a maximum distance between the projector and the points at which a range finding beam is projected in relation to all sets of distances collected (e.g., each set of distances corresponding to distances between the projector and each point onto which each of the range finding beams is projected at each different point in the revolution of wheel 231).

It is noted that in some embodiments, measurements at more than two points in the revolution of wheel 231 may be collected. As such, it is noted that the discussion herein of data collection associated with camber angles of wheel 231 at a first point and a second point in the revolution of wheel 231 is merely for illustrative purposes and should not be construed as limiting in any way. In some embodiments, data associated with camber angles of wheel 231 at additional points in the revolution of wheel 231, such as 4, 6, 8, 12, 32, etc., points in the revolution of wheel 231 may be collected. In some embodiments, data associated with camber angles of wheel 231 may be collected continuously through the revolution of wheel 231, rather than at different discrete points.

With reference back to FIG. 1, server 110, user interface 140, and sensor 130 may be communicatively coupled via network 145. Network 145 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc. In some embodiments, sensor 130 and server 110 may be communicatively coupled directly, without routing through network 145, such as via a direct connection between sensor 130 and server 110.

Server 110 may be configured to facilitate operations for measuring a camber angle of a wheel attached to a target axle at at least one point in a revolution of the wheel, determining whether a defect is present in the target axle based on the camber angle of the wheel at the at least one point in the revolution of the wheel, and generating an alert in response to a determination that a defect is present in the target axle in accordance with embodiments of the present disclosure. The functionality of server 110 may be provided by the cooperative operation of the various components of server 110, as will be described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. Furthermore, those of skill in the art would recognize that although FIG. 1 illustrates components of server 110 as single and separate blocks, each of the various components of server 110 may be a single component (e.g., a single application, server module, etc.), may be functional components of a same component, or the functionality may be distributed over multiple devices/components. In such embodiments, the functionality of each respective component may be aggregated from the functionality of multiple modules residing in a single, or in multiple devices. In addition, particular functionality described for a particular component of server 110 may actually be part of a different component of server 110, and as such, the description of the particular functionality described for the particular component of server 110 is for illustrative purposes and not limiting in any way.

As shown in FIG. 1, server 110 includes processor 111, memory 112, database 126, camber measurement logic 120, defect detector 122, and alert generator 124. Processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some embodiments, implementations of processor 111 may comprise code segments (e.g., software, firmware, and/or hardware logic) executable in hardware, such as a processor, to perform the tasks and functions described herein. In yet other embodiments, processor 111 may be implemented as a combination of hardware and software. Processor 111 may be communicatively coupled to memory 112.

Memory 112 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 112 may comprise a processor readable medium configured to store one or more instruction sets (e.g., software, firmware, etc.) which, when executed by a processor (e.g., one or more processors of processor 111), perform tasks and functions as described herein.

Memory 112 may also be configured to facilitate storage operations. For example, memory 112 may comprise database 126 for storing various information related to operations of system 100. In some embodiments, database 126 may store configuration parameters related to operations of system 100, such as user information, wheel profiles, acceptable camber angles, predetermined thresholds for variations of camber angles, etc. In some embodiments, database 126 may store machine learning models, mathematical models, rules models, and/or other models that may be used by components of server 110 to analyze and process collected data associated with camber angles of a wheel attached to a target axle to detect whether the target axle has a defect or not. In some embodiments, detecting whether a target axle to detect whether a target axle has a defect or not may include determining a probability or likelihood that the target axle to detect has a defect and determining that the target axle has a defect when the probability or likelihood exceeds a threshold. Database 126 is illustrated as integrated into memory 112, but in some embodiments, database 126 may be provided as a separate storage module or may be provided as a cloud-based storage module. Additionally, or alternatively, database 126 may be a single database, or may be a distributed database implemented over a plurality of database modules.

Camber measurement logic 120 may be configured to measure a camber angle of a wheel attached to a target axle at at least one point in a revolution of the wheel. In embodiments, camber measurement logic 120 may measure the camber angle of a wheel attached to a target axle at the at least one point in a revolution of the wheel based on the data associated with the camber angle of the wheel at the at least one point in the revolution of the wheel as collected by sensor 130. In embodiments, the data associated with the camber angle of a wheel at the at least one point in a revolution of the wheel collected by sensor 130 may represent data associated with a camber angle of a wheel at different points in the revolution of the wheel, such as at different points in the revolution of the wheel in which sensor 130 may collect measurements. In some embodiments, camber measurement logic 120 may be configured to measure the camber angle at each of the different points in the revolution of the wheel based on the data collected by sensor 130 at each of the different points in the revolution of the wheel. In some embodiments, camber measurement logic 120 may be configured to measure the camber angle at a point in the revolution of the wheel corresponding to the largest measurement collected by sensor 130. In these cases, camber measurement logic 120 may measure the camber angle corresponding to the largest camber angle (e.g., based on the largest measurement collected by sensor 130) of the wheel, instead of measuring every camber angle at each point in the revolution of the wheel in which sensor 130 may collect measurements.

In embodiments, camber measurement logic 120 may measure a camber angle of a wheel based on the distance measurements collected by sensor 130. For example, camber measurement logic 120 may measure a camber angle of a wheel based on the distance between lines projected on to a surface of the wheel and/or based on the distance between a projector of range finding beams and the points onto which the range finding beams are projected.

For example, with reference to FIG. 3A, sensor 130 may collect and transmit to camber measurement logic 120, distances 310*a*, 312*a*, and 314*a* associated with lines 320, 322, and 324 projected onto surface 236 of wheel 231 at a first point in the revolution of wheel 231. It is noted that this first point in the revolution of wheel 231 may represent a point at which a defect present in the target axle to which wheel 231 may be attached may be rotationally positioned in such a direction as to not affect the normal flexing of the target axle or as to not affect the camber angle of wheel 231 by more than a threshold amount (e.g., may be rotationally positioned on the bottom half of axle 230). In this case, camber angle 330 of wheel 231 at the first point in the revolution of wheel 231 may be a "normal" or "acceptable" camber angle. Camber measurement logic 120 may be configured to measure a camber angle of wheel 231 at the first point in the revolution of wheel 231 based on distances 310*a*, 312*a*, and 314*a*. For example, camber measurement logic 120 may determine that distances 310*a*, 312*a*, and 314*a* may indicate that wheel 321 has a camber angle 330. In embodiments, camber measurement logic 120 may determine that distances 310*a*, 312*a*, and 314*a* may indicate that wheel 321 has a camber angle 330 based on mathematical operations applied to distances 310*a*, 312*a*, and 314*a*. For example, the ideal distances between the three lines 320, 322, and 324 (e.g., the distances when the camber angle of wheel 321 is zero degrees) may be known. In this case, camber measurement logic 120 may determine a difference between distances 310*a*, 312*a*, and 314*a* and the ideal distances to determine the camber angle indicated by distances 310*a*, 312*a*, and 314*a*. In this manner, camber measurement logic may measure the camber angle of wheel 321 at the first point in the revolution of wheel 321. In embodiments, camber measurement logic 120 may report or transmit the camber angle measurements to defect detector 122.

With reference to FIG. 3B, sensor 130 may collect and transmit to camber measurement logic 120, distances 310b, 312b, and 314b associated with lines 320, 322, and 324 projected onto surface 236 of wheel 231 at a second point in the revolution of wheel 231. It is noted that this second point in the revolution of wheel 231 may be different from the first point in the revolution of wheel 231 and may represent a point at which a defect present in the target axle to which wheel 231 may be attached may be rotationally positioned in such a direction as to affect the normal flexing of the target axle or as to affect the camber angle of wheel 231 by more than a threshold amount (e.g., may be rotationally positioned on the top half of axle 230). Camber measurement logic 120 may be configured to measure a camber angle of wheel 231 at the second point in the revolution of wheel 231 based on distances 310b, 312b, and 314b. For example, camber measurement logic 120 may determine that distances 310b, 312b, and 314b may indicate that wheel 321 has a camber angle 331. Camber measurement logic 120 may determine a difference between distances 310b, 312b, and 314b and the ideal distances (e.g., the distances when the camber angle of wheel 321 is zero degrees) to determine the camber angle indicated by distances 310b, 312b, and 314b. In this manner, camber measurement logic may measure the camber angle of wheel 321 at the second point in the revolution of wheel 331 as camber angle 331. It is noted that, camber angle 331 of wheel 231 at the second point in the revolution of wheel 231 may be larger than camber angle 330 of wheel 231 at the first point in the revolution of wheel 231, as the defect in the target axle to which wheel 231 is attached may be rotationally positioned in the top half of the target axle at the second point in the revolution of wheel 231, thereby increasing the camber angle of wheel 231 from the camber angle at the first point in the revolution of wheel 231. In embodiments, camber measurement logic 120 may report or transmit the camber angle measurements to defect detector 122.

With reference to FIG. 4A, sensor 130 may collect and transmit to camber measurement logic 120, distances 420 and 422 associated with range finding beams projected onto points 425 and 427 on surface 236 of wheel 231 at a first point in the revolution of wheel 231. It is again noted that this first point in the revolution of wheel 231 may represent a point at which a defect present in the target axle to which wheel 231 may be attached may be rotationally positioned in such a direction as to not affect the normal flexing of the target axle or as to not affect the camber angle of wheel 231 by more than a threshold amount (e.g., may be rotationally positioned on the bottom half of axle 230). In this case, camber angle 410 of wheel 231 at the first point in the revolution of wheel 231 may be a "normal" or "acceptable" camber angle. Camber measurement logic 120 may be configured to measure a camber angle of wheel 231 at the first point in the revolution of wheel 231 based on distance 420 and 422. For example, distance 420 may represent a distance between projector 131 of sensor 130 and point 425 on surface 236 of wheel 231. In this same example, distance 422 may represent a distance between projector 131 of sensor 130 and point 427 on surface 236 of wheel 231, which is a different point than point 425. Camber measurement logic 120 may be configured to apply mathematical and geometrical operations to determine the camber angle of wheel 231. For example, knowing distance 420 and 422, as well as the source point of the range finding beams, camber measurement logic 120 may measure the angle of the vertical axis running through wheel 231. In this case, camber measurement logic 120 may determine that distances 420 and 422 may indicate that wheel 321 has a camber angle 410. In embodiments, camber measurement logic 120 may report or transmit the camber angle measurements to defect detector 122.

With reference to FIG. 4B, sensor 130 may collect and transmit to camber measurement logic 120, distances 421 and 423 associated with range finding beams projected onto points 425 and 427 on surface 236 of wheel 231 at a second point in the revolution of wheel 231. It is noted that this second point in the revolution of wheel 231 may be different from the first point in the revolution of wheel 231 and may represent a point at which a defect present in the target axle to which wheel 231 may be attached may be rotationally positioned in such a direction as to affect the normal flexing of the target axle or as to affect the camber angle of wheel 231 by more than a threshold amount (e.g., may be rotationally positioned on the top half of axle 230). Camber measurement logic 120 may be configured to measure a camber angle of wheel 231 at the second point in the revolution of wheel 231 based on distances 421 and 423. For example, distance 421 may represent a distance between projector 131 of sensor 130 and point 425 on surface 236 of wheel 231. In this same example, distance 423 may represent a distance between projector 131 of sensor 130 and point 427 on surface 236 of wheel 231, which is a different point than point 425. Camber measurement logic 120 may use mathematical and geometrical operations to determine that distances 421 and 423 may indicate that wheel 321 has a camber angle 411. It is noted that, camber angle 411 of wheel 231 at the second point in the revolution of wheel 231 may be larger than camber angle 410 of wheel 231 at the first point in the revolution of wheel 231, as the defect in the target axle to which wheel 231 is attached may be rotationally positioned in the top half of the target axle at the second point in the revolution of wheel 231, thereby increasing the camber angle of wheel 231 from the camber angle at the first point in the revolution of wheel 231. In embodiments, camber measurement logic 120 may report or transmit the camber angle measurements to defect detector 122.

In some embodiments, camber measurement logic 120 may, instead of measuring the camber angle of wheel 321 at each of the first and second point in the revolution of wheel 321, determine that the camber angle of wheel 321 has changed by more than predetermined threshold. For example, camber measurement logic 120 may determine that the camber angle at the second point in the revolution of wheel 231 is larger than the camber angle at the first point in the revolution of wheel 231. In embodiments, camber measurement logic 120 may report the camber angle change to defect detector 122. In some embodiments, (e.g., when data for more than two points in the revolution of wheel 231 is collected), camber measurement logic 120 may report the camber angle changes between all points measured or may report the largest change. For example, camber measurement logic 120 may determine that a camber angle change between two points in the revolution of wheel 231 is larger than the camber angle change at any other two points in the revolution of wheel 231. In this case, camber measurement logic 120 may report this largest change to defect detector 122. In some embodiments, camber measurement logic 120 may, instead of measuring the camber angle of wheel 321 at each of the first and second point in the revolution of wheel 321, determine that the camber angle of wheel 321 has changed. For example, camber measurement logic 120 may determine that the distances measured by sensor 130 at the second point in the revolution of wheel 321 are different from the distances measured by sensor 130 at the first point in the revolution of wheel 321. In some case, camber measurement logic 120 may determine that the distances measured by sensor 130 at the second point in the revolution of wheel 321 are different from the distances measured by sensor 130 at the first point in the revolution of wheel 321 by more than a predetermined threshold. In these cases, camber measurement logic 120 may report the measurement differences to defect detector 122.

It is noted that, a measurement of a camber angle of a wheel may represent a measurement of the camber angle of the wheel at a particular point in the revolution of the wheel. As such, in embodiments, camber measurement logic 120 may be configured to measure a plurality of camber angles, each camber angle corresponding to the camber angle of the wheel at a different point in the revolution of the wheel, based on the data collected by sensor 130 at the different points in the revolution of the wheel. As has been noted above, the camber angle of a wheel during a revolution may be affected by a defect in the axle to which the wheel is attached. In this case, the camber angle of a wheel measured by camber measurement logic 120 may be used to determine whether a defect is present in a target axle to which the wheel is attached.

With reference back to FIG. 1, defect detector 122 may be configured to determine whether a defect is present in the target axle based on the camber angle of the wheel at the at least one point in a revolution of the wheel. For example, defect detector 122 may determine whether a camber angle of a wheel attached to a target axle at one or more points in the revolution of the wheel indicates that a defect is present or not in the target axle. In embodiments, determining whether a camber angle of a wheel attached to a target axle at one or more points in the revolution of the wheel indicates that a defect is present or not in the target axle may include determining a probability or likelihood that a camber angle of a wheel attached to a target axle at one or more points in the revolution of the wheel indicates that a defect is present in the target axle. In some embodiments, defect detector 122 may determine that a camber angle of a wheel attached to a target axle at one or more points in the revolution of the wheel indicates that a defect is present in the target axle when the probability or likelihood that the camber angle of the indicates that a defect is present in the target axle exceeds a threshold.

As discussed above, the camber angle of a wheel may be affected by a defect in the axle to which the wheel is attached. In embodiments, defect detector 122 may determine that a camber angle of a wheel attached to a target axle at a point in the revolution of the wheel may indicate that a defect is present in the target axle, when the camber angle of the wheel at the point in the revolution of the wheel exceeds a predetermined threshold. In embodiments, the predetermined threshold may be a predetermined angle, such as a 0.186 degree angle, or an angle of approximately 0.2 degrees. In this example, defect detector 122 may determine that an axle may be defective when camber angle measurements provided by camber measurement logic 120 for a wheel attached to the target axle includes a camber angle of the wheel at a point in the revolution of the wheel that exceeds the predetermined threshold.

In embodiments, defect detector 122 may determine that a target axle may be defective when camber angle measurements provided by camber measurement logic 120 for a wheel attached to the target axle includes data indicating a camber angle at a point in the revolution of the wheel that is larger than a normal camber angle by more than a predetermined threshold. For example, a normal camber angle may be configured, which may indicate a camber angle of a wheel attached to an axle with no defects (e.g., a normal camber angle of 0.01-0.02). In some embodiments, the predetermine threshold may also be configured (e.g., may be a predetermined threshold of 0.02-0.1 degrees). In these embodiments, defect detector 122 may determine that a target axle is defective when camber angle measurements provided by camber measurement logic 120 indicate that a camber angle at a point in the revolution of the wheel that is larger than the configured normal camber by more than the configured predetermined threshold.

In some embodiments, the normal camber angle and the predetermined threshold that may not be exceeded may be determined by configuring a normal distribution based on known good wheelsets. For example, known good wheelsets, which may include an axle without a defect, may be fed into system 100 and, for each wheelset, a set of camber angle measurements including camber angle measurements for a plurality of points in a revolution of a wheel attached to the good axle may be obtained. A normal distribution may be obtained from the plurality of sets of camber angle measurements. In this case, defect detector 122 may determine that a camber angle measurement that is found to be outside of the normal distribution indicates a defective axle.

In some embodiments, defect detector 122 may include a learning model that may adjust the value of what a normal camber angle may be, as well as to what the predetermined threshold that may not be exceeded. For example, during operation, system 100 may determine a defective axle based on a determination that a camber angle at a point in the revolution of a wheel attached to the target axle is larger than the configured normal camber angle by more than the configured predetermined threshold. However, it may be found that the determination by system 100 of the defective axle is a false positive. In this case, the data may be fed back into defect detector 122, which may be configured to learn and to adjust the configuration of what an acceptable camber angle and an acceptable threshold may be.

In some embodiments, defect detector 122 may be configured to combine the camber angle measurements provided by camber measurement logic 120 for the plurality of points in the revolution of the wheel to obtain an average camber angle measurement for the revolution of the wheel. For example, camber measurement logic 120 may provide a camber angle measurement for each of a plurality of points in the revolution of the wheel. Defect detector 122 may combine (e.g., may average) the plurality of camber angle measurements to obtain an average camber angle for the revolution of the wheel. Defect detector 122 may compare the average camber angle to a predetermined threshold and may determine that a defect is present in the target axle when the average camber angle exceeds the predetermined threshold.

In some embodiments, defect detector 122 may be configured to determine whether a defect is present in a target axle based on camber angle measurements of a wheel and a profile of the wheel. For example, in embodiments, a profile of the wheel attached to the target axle may be obtained. In these embodiments, sensor 130 may be configured to detect the profile of the wheel, such as by using the plurality of lines and determining the profile of the wheel. In this case, the measured profile of the wheel may be compared to wheel profiles stored in a database (e.g., database 126) of wheel profiles to find a profile match. In embodiments, the wheel profiles in the database may include indications of normal camber angle ranges. For example, a first wheel profile may include an indication of a range of acceptable or normal camber angles. This range of normal camber angles indicates the camber angles normally found for this first wheel profile when the wheel having the first wheel profile is attached to an axle having no defects. In these embodiments, defect detector 122 may compare the camber angle measured for the wheel at different points of the revolution of the wheel against the normal range of the wheel based on the wheel profile and, when the measured camber angle is within the normal range, defect detector may determine that no defect is present in the target axle to which the wheel is attached. However, defect detector 122 may determine that a defect is present in the target axle to which the wheel is attached, when the measured camber angle of the wheel at any point in the revolution of the wheel is outside the normal range of the wheel based on the wheel profile.

Alert generator 124 may be configured to generate an alert in response to a determination that a defect is present in the target axle. In embodiments, the alerts generated by alert generator 124 may include alerts of different severity levels. For example, an alert of a first severity level may indicate to the operator that the defect detected in the target axle is severe and the train must be stopped immediately to avoid a potentially catastrophic failure. An alert of a second severity level may indicate to the operator that the defect detected in the target axle is moderate and the train may be taken to the next available inspection point for further action. An alert of a third severity level may indicate to the operator that the defect detected in the target axle is low and the train may be allowed to continue to its destination where further action may be taken. In embodiments, the alert may be handled by scheduling or performing an in-depth inspection, which may include taking the target axle to a shop for inspection, replacement of the target axle, and/or repair of the target axle.

It is noted that the discussion above with respect to three severity levels is for illustrative purposes and should not be construed as limiting in any way. Indeed, in embodiments, more or less than three severity levels may be used for categorizing alerts and in these cases, the severity of the alerts may correspond to the severity of the defect detected in the target axle.

Figure 5:
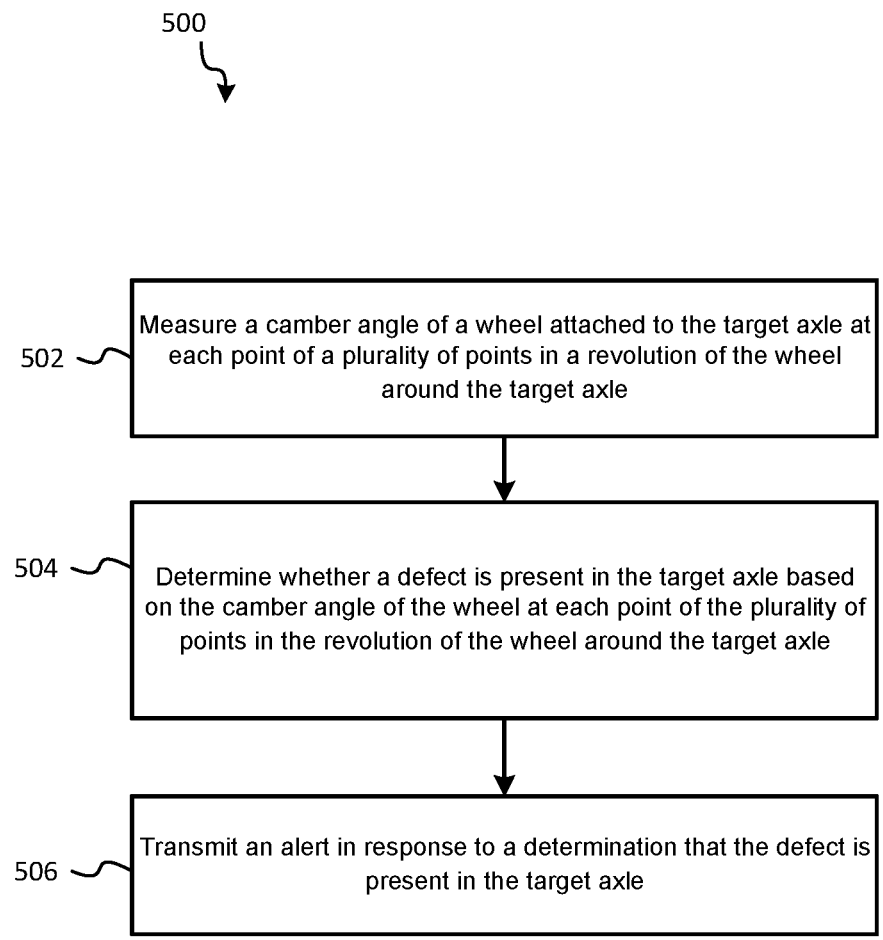
FIG. 5 shows a high-level flow diagram of operation of a system configured in accordance with embodiments of the present disclosure for inspection of freight car axles.

FIG. 5 shows a high-level flow diagram 500 of operation of a system configured in accordance with embodiments of the present disclosure for providing in-service inspection of freight car axles. For example, the functions illustrated in the example blocks shown in FIG. 5 may be performed by system 100 of FIG. 1 according to embodiments herein. In embodiments, the operations of the method 500 may be stored as instructions that, when executed by one or more processors, cause the one or more processors to perform the operations of the method 500.

At block 502, a camber angle of a wheel attached to the target axle is measured at each point of a plurality of points in a revolution of the wheel around the target axle. In embodiments, functionality of a sensor and/or a camber measurement logic (e.g., sensor 130 and/or camber measurement logic 120 in FIG. 1) may be used to measure a camber angle of a wheel attached to the target axle at each point of a plurality of points in a revolution of the wheel around the target axle. In embodiments, the sensor and/or a camber measurement logic may perform operations to measure the camber angle of the wheel attached to the target axle at each point of the plurality of points in the revolution of the wheel around the target axle according to operations and functionality as described above with reference to sensor 130 and/or camber measurement logic 120 and as illustrated in FIGS. 1-4B.

At block 504, a determination is made as to whether a defect is present in the target axle based on the camber angle of the wheel at each point of the plurality of points in the revolution of the wheel around the target axle. In embodiments, functionality of a defect detector (e.g., defect detector 122 in FIG. 1) may be used to determine whether a defect is present in the target axle based on the camber angle of the wheel at each point of the plurality of points in the revolution of the wheel around the target axle. In embodiments, the defect detector may perform operations to determine whether a defect is present in the target axle based on the camber angle of the wheel at each point of the plurality of points in the revolution of the wheel around the target axle according to operations and functionality as described above with reference to defect detector 122 and as illustrated in FIGS. 1-4B.

At block 506, an alert may be transmitted in response to a determination that the defect is present in the target axle. In embodiments, functionality of an alert generator (e.g., alert generator 124 in FIG. 1) may be used to transmit an alert in response to a determination that the defect is present in the target axle. In embodiments, the alert generator may perform operations to transmit an alert in response to a determination that the defect is present in the target axle according to operations and functionality as described above with reference to alert generator 124 and as illustrated in FIGS. 1-4B.

Figure 6:
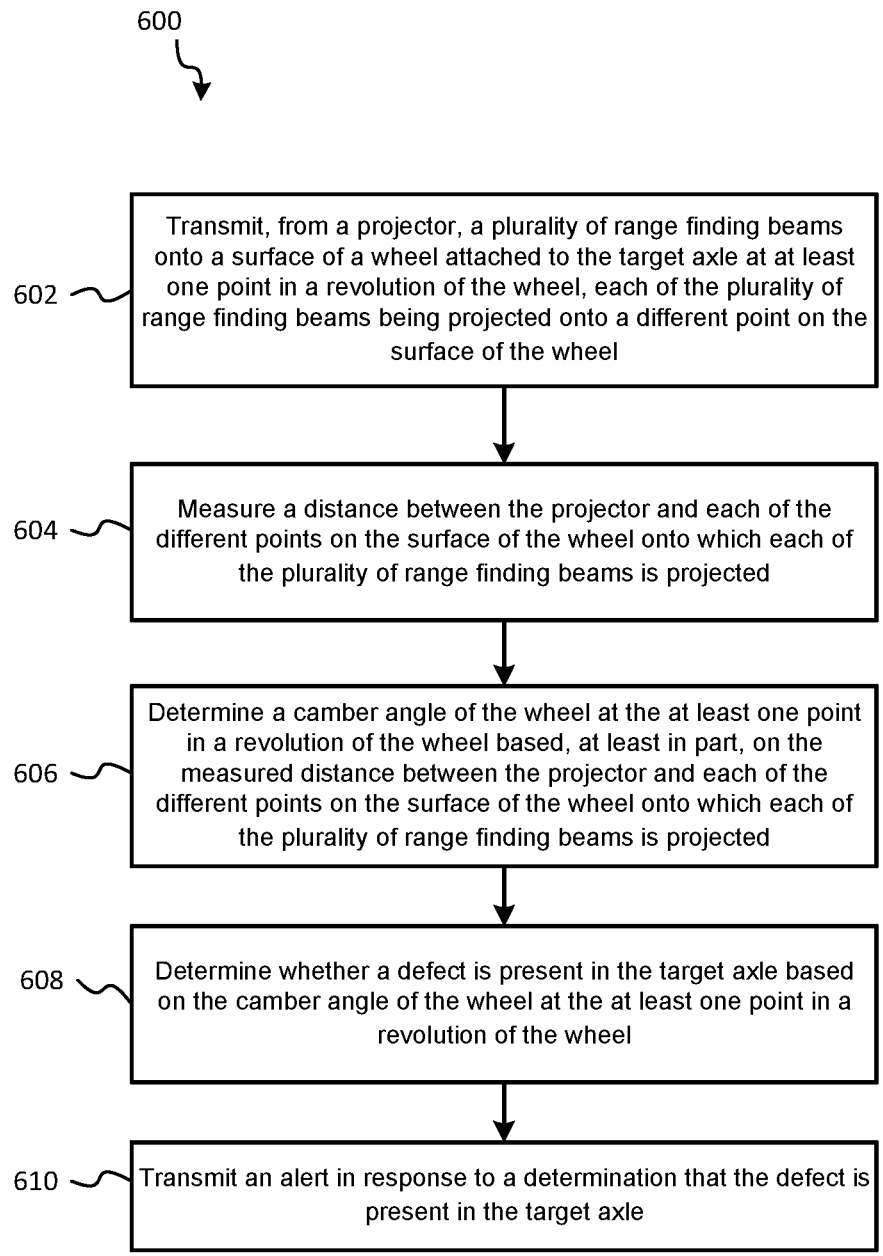
FIG. 6 shows another high-level flow diagram of operation of a system configured in accordance with embodiments of the present disclosure for inspection of freight car axles.

FIG. 6 shows a high-level flow diagram 600 of operation of a system configured in accordance with embodiments of the present disclosure for providing in-service inspection of freight car axles. For example, the functions illustrated in the example blocks shown in FIG. 6 may be performed by system 100 of FIG. 1 according to embodiments herein. In embodiments, the operations of the method 600 may be stored as instructions that, when executed by one or more processors, cause the one or more processors to perform the operations of the method 600.

At block 602, a plurality of range finding beams may be transmitted, from a projector, onto a surface of a wheel attached to the target axle at at least one point in a revolution of the wheel. In embodiments, each of the plurality of range finding beams is projected onto a different point on the surface of the wheel. In embodiments, functionality of a sensor (e.g., projector 131 of sensor 130 in FIG. 1) may be used to transmit the plurality of range finding beams onto the surface of the wheel attached to the target axle at the at least one point in a revolution of the wheel. In embodiments, the sensor may perform operations to transmit the plurality of range finding beams onto the surface of the wheel attached to the target axle at the at least one point in a revolution of the wheel according to operations and functionality as described above with reference to projector 131 of sensor 130 and as illustrated in FIGS. 1-4B.

At block 604, a distance between the projector and each of the different points on the surface of the wheel onto which each of the plurality of range finding beams is projected is measured. In embodiments, functionality of a sensor (e.g., data collector 132 of sensor 130 in FIG. 1) may be used to measure a distance between the projector and each of the different points on the surface of the wheel onto which each of the plurality of range finding beams is projected. In embodiments, the sensor may perform operations to measure a distance between the projector and each of the different points on the surface of the wheel onto which each of the plurality of range finding beams is projected according to operations and functionality as described above with reference to data collector 132 of sensor 130 and as illustrated in FIGS. 1-4B.

At block 606, a camber angle of the wheel at the at least one point in a revolution of the wheel is determined based, at least in part, on the measured distance between the projector and each of the different points on the surface of the wheel onto which each of the plurality of range finding beams is projected. In embodiments, functionality of a camber measurement logic (e.g., camber measurement logic 120 in FIG. 1) may be used to determine a camber angle of the wheel at the at least one point in a revolution of the wheel based, at least in part, on the measured distance between the projector and each of the different points on the surface of the wheel onto which each of the plurality of range finding beams is projected. In embodiments, the camber measurement logic may perform operations to determine a camber angle of the wheel at the at least one point in a revolution of the wheel based, at least in part, on the measured distance between the projector and each of the different points on the surface of the wheel onto which each of the plurality of range finding beams is projected according to operations and functionality as described above with reference to camber measurement logic 120 and as illustrated in FIGS. 1-4B.

At block 608, a determination is made as to whether a defect is present in the target axle based on the camber angle of the wheel at each point of the plurality of points in the revolution of the wheel around the target axle. In embodiments, functionality of a defect detector (e.g., defect detector 122 in FIG. 1) may be used to determine whether a defect is present in the target axle based on the camber angle of the wheel at each point of the plurality of points in the revolution of the wheel around the target axle. In embodiments, the defect detector may perform operations to determine whether a defect is present in the target axle based on the camber angle of the wheel at each point of the plurality of points in the revolution of the wheel around the target axle according to operations and functionality as described above with reference to defect detector 122 and as illustrated in FIGS. 1-4B.

At block 610, an alert may be transmitted in response to a determination that the defect is present in the target axle. In embodiments, functionality of an alert generator (e.g., alert generator 124 in FIG. 1) may be used to transmit an alert in response to a determination that the defect is present in the target axle. In embodiments, the alert generator may perform operations to transmit an alert in response to a determination that the defect is present in the target axle according to operations and functionality as described above with reference to alert generator 124 and as illustrated in FIGS. 1-4B.

Figure 7:
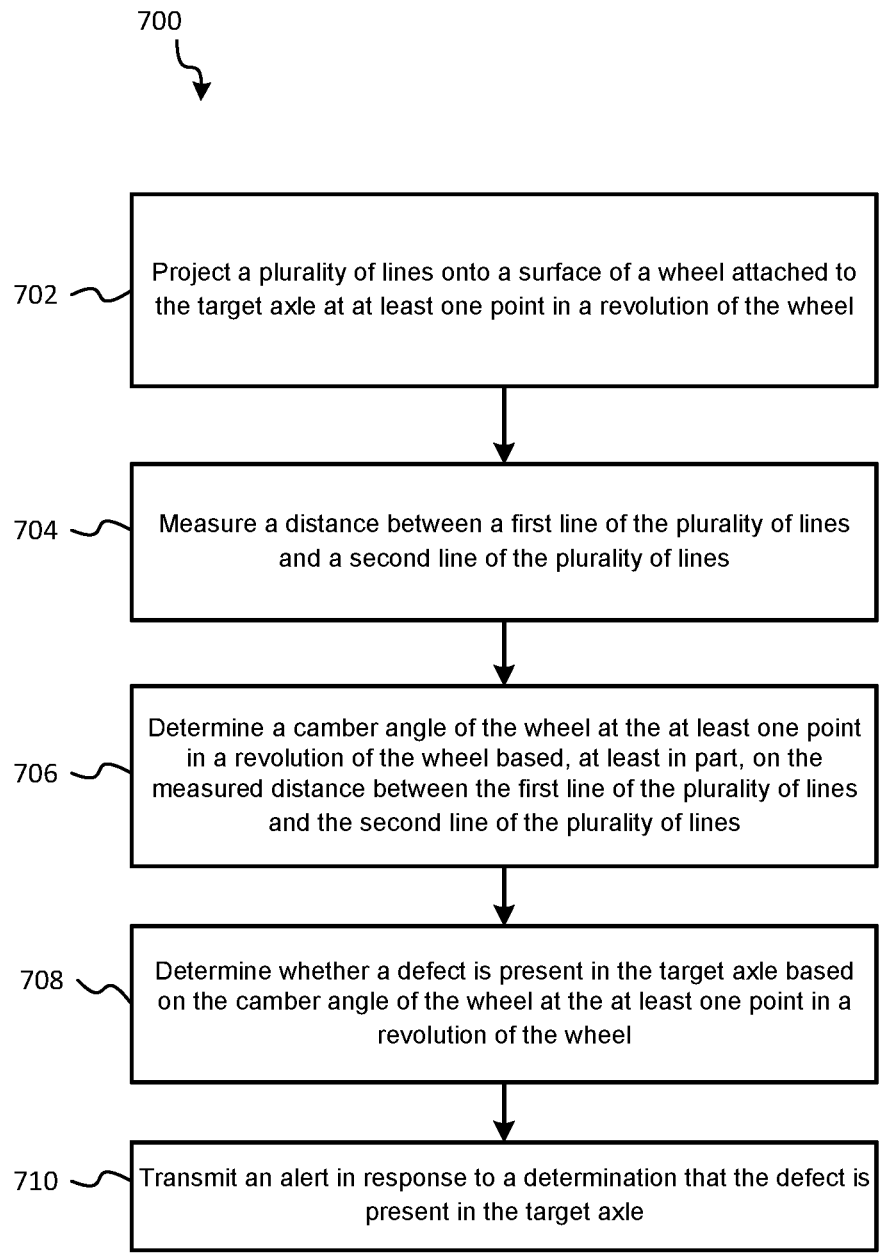
FIG. 7 shows still another high-level flow diagram of operation of a system configured in accordance with embodiments of the present disclosure for inspection of freight car axles.

FIG. 7 shows a high-level flow diagram 700 of operation of a system configured in accordance with embodiments of the present disclosure for providing in-service inspection of freight car axles. For example, the functions illustrated in the example blocks shown in FIG. 7 may be performed by system 100 of FIG. 1 according to embodiments herein. In embodiments, the operations of the method 700 may be stored as instructions that, when executed by one or more processors, cause the one or more processors to perform the operations of the method 700.

At block 702, a plurality of lines may be projected onto a surface of a wheel attached to the target axle at at least one point in a revolution of the wheel. In embodiments, functionality of a sensor (e.g., projector 131 of sensor 130 in FIG. 1) may be used to project the plurality of lines onto the surface of the wheel attached to the target axle at the at least one point in a revolution of the wheel. In embodiments, the sensor may perform operations to project the plurality of lines onto the surface of the wheel attached to the target axle at the at least one point in a revolution of the wheel according to operations and functionality as described above with reference to projector 131 of sensor 130 and as illustrated in FIGS. 1-4B.

At block 704, a distance between a first line of the plurality of lines and a second line of the plurality of lines is measured. In embodiments, functionality of a sensor (e.g., data collector 132 of sensor 130 in FIG. 1) may be used to measure a distance between a first line of the plurality of lines and a second line of the plurality of lines. In embodiments, the sensor may perform operations to measure a distance between a first line of the plurality of lines and a second line of the plurality of lines according to operations and functionality as described above with reference to data collector 132 of sensor 130 and as illustrated in FIGS. 1-4B.

At block 706, a camber angle of the wheel at the at least one point in a revolution of the wheel is determined based, at least in part, on the measured distance between the first line of the plurality of lines and the second line of the plurality of lines. In embodiments, functionality of a camber measurement logic (e.g., camber measurement logic 120 in FIG. 1) may be used to determine a camber angle of the wheel at the at least one point in a revolution of the wheel based, at least in part, on the measured distance between the first line of the plurality of lines and the second line of the plurality of lines. In embodiments, the camber measurement logic may perform operations to determine a camber angle of the wheel at the at least one point in a revolution of the wheel based, at least in part, on the measured distance between the first line of the plurality of lines and the second line of the plurality of lines according to operations and functionality as described above with reference to camber measurement logic 120 and as illustrated in FIGS. 1-4B.

At block 708, a determination is made as to whether a defect is present in the target axle based on the camber angle of the wheel at each point of the plurality of points in the revolution of the wheel around the target axle. In embodiments, functionality of a defect detector (e.g., defect detector 122 in FIG. 1) may be used to determine whether a defect is present in the target axle based on the camber angle of the wheel at each point of the plurality of points in the revolution of the wheel around the target axle. In embodiments, the defect detector may perform operations to determine whether a defect is present in the target axle based on the camber angle of the wheel at each point of the plurality of points in the revolution of the wheel around the target axle according to operations and functionality as described above with reference to defect detector 122 and as illustrated in FIGS. 1-4B.

At block 710, an alert may be transmitted in response to a determination that the defect is present in the target axle. In embodiments, functionality of an alert generator (e.g., alert generator 124 in FIG. 1) may be used to transmit an alert in response to a determination that the defect is present in the target axle. In embodiments, the alert generator may perform operations to transmit an alert in response to a determination that the defect is present in the target axle according to operations and functionality as described above with reference to alert generator 124 and as illustrated in FIGS. 1-4B.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules in FIGS. 1-7 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, can include compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system configured to provide in-service inspection of rail car axles, comprising:
   a projector configured to transmit a plurality of objects onto different points of a surface of a wheel at a first point in a revolution of the wheel about an axle;
   a data collector configured to collect data associated with objects projected onto the surface of the wheel by the projector at any point of the revolution of wheel; and
   a server, operably coupled to the data collector, and configured to measure the camber angle of the wheel based on the data and determine whether a defect is present in the axle based on the measured camber angle of wheel, wherein determining whether a defect is present in the axle includes determining whether the camber angle of the wheel at a first of the at least one point in the revolution of the wheel is larger than a predetermined threshold angle.

2. The system of claim 1, wherein the data includes at least one point in a revolution of the wheel.

3. The system of claim 1, wherein the server generates an alert in response to a determination that a defect is present in the axle.

4. The system of claim 1, wherein the sensor is positioned with a line-of-sight toward the railroad track such that sensor is able to collect data associated with a camber angle at at least one point in a revolution of any wheel passing through the line-of-sight of sensor.

5. The system of claim 1, wherein the projector and the data collector are included as components of a sensor.

6. The system of claim 1, wherein each of the objects are projected onto a different portion of the surface of the wheel.

7. The system of claim 1, wherein the object includes at least one beam or a plurality of lines.

8. A system for detecting a presence of a defect in a target axle of a freight car wheelset in-service, comprising:
   a projector configured to project a plurality of lines onto a surface of a wheel attached to the target axle at at least one point in a revolution of the wheel;
   a memory having a first database with configuration parameters related to operations of the system; and
   a computer processor operably coupled to the memory and capable of executing machine-readable instructions to perform program steps, the program steps including:
      measuring a distance between a first line of the plurality of lines and a second line of the plurality of lines;
      determining a camber angle of the wheel at the at least one point in a revolution of the wheel based, at least in part, on the measured distance between the first line of the plurality of lines and the second line of the plurality of lines;
      determining a defect is present in the target axle when the camber angle of the wheel at a first of at least one point in a revolution of the wheel is larger than a predetermined threshold angle; and
      transmitting an alert in response to a determination that the defect is present in the target axle.

9. The system of claim 8, wherein the defect is present in one or more of:
   a body of the target axle; and
   a journal filet of the target axle.

10. The system of claim 8, wherein the at least one point in the revolution of the wheel incudes a plurality of points in the revolution of the wheel, and wherein determining the camber angle of the wheel at the at least one point in the revolution of the wheel includes determining a camber angle at each of the plurality of points in the revolution of the wheel.

11. The system of claim 10, wherein a first point in the plurality of points in the revolution of the wheel is at least between 90 and 180 degrees from a second point in the plurality of points in the revolution of the wheel, and wherein determining whether a defect is present in the target axle based on the camber angle of the wheel at the at least one point in a revolution of the wheel includes determining whether a defect is present in the target axle based on a camber angle of the wheel at the first point in the plurality of points in the revolution of the wheel and a camber angle of the wheel at the second point in the plurality of points in the revolution of the wheel.

12. The system of claim 8, wherein determining whether a defect is present in the target axle includes determining whether a camber angle of the wheel at a first of the at least one point in the revolution of the wheel is larger than a camber angle of the wheel at a second of the at least one point in the revolution of the wheel by a threshold value.

13. The system of claim 8, further comprising determining that a defect is not present in the target axle in response to a determination that no camber angle of the wheel at any point in the revolution of the wheel exceeds the predetermined threshold.

14. The system of claim 8, wherein determining whether a defect is present in the target axle includes determining whether a camber angle of the wheel at a first of the at least one point in the revolution of the wheel is larger than a reference camber angle by a threshold value, the reference camber angle representing a camber angle of a wheel attached to a undefective axle.

15. The system of claim 8, wherein determining the camber angle of the wheel at the at least one point in a revolution of the wheel based, at least in part, on the measured distance between a first line of the plurality of lines and a second line of the plurality of lines includes:

measuring a distance between each pair combination of the plurality of lines to generate a set of distance measurements for each of the at least one point in the revolution of the wheel.

16. A system for detecting a presence of a defect in a target axle of a freight car wheelset in-service, comprising:
a projector configured to project a plurality of lines onto a surface of a wheel attached to the target axle at at least one point in a revolution of the wheel;
a memory having a first database with configuration parameters related to operations of the system; and
a computer processor operably coupled to the memory and capable of executing machine-readable instructions to perform program steps, the program steps including:
measuring a camber angle of a wheel attached to the target axle at one or more points of the plurality of points in a revolution of the wheel;
determining whether a defect is present in the target axle based on the camber angle of the wheel at each point of the plurality of points in the revolution of the wheel around the target axle, wherein determining whether a defect is present in the target axle includes determining whether a camber angle of the wheel at one or more points of the plurality of points in the revolution of the wheel is larger than a predetermined threshold angle; and
transmitting an alert in response to a determination that the defect is present in the target axle.

17. The system of claim 16, wherein measuring the camber angle of the wheel at each point of the plurality of points in the revolution of the wheel around the target axle includes one or more of:
a first camber angle measuring process including:
transmitting, from a projector, a plurality of range finding beams onto a surface of the wheel at each point of the plurality of points in the revolution of the wheel, each of the plurality of range finding beams projected onto a different point on the surface of the wheel; and
measuring a distance between the projector and each of the different points on the surface of the wheel onto which each of the plurality of range finding beams is projected; and
a second camber angle measuring process including:
projecting a plurality of lines onto the surface of the wheel attached to the target axle at each point of the plurality of points in the revolution of the wheel; and
measuring a distance between a first line of the plurality of lines and a second line of the plurality of lines.

18. A system configured to provide in-service inspection of rail car axles, comprising:
a projector configured to transmit a plurality of objects onto different points of a surface of a wheel at a first point in a revolution of the wheel about an axle;
a data collector configured to collect data associated with objects projected onto the surface of the wheel by the projector at any point of the revolution of wheel; and
a server, operably coupled to the data collector, and configured to measure the camber angle of the wheel based on the data and determine whether a defect is present in the axle based on the measured camber angle of wheel, wherein determining whether a defect is present in the axle includes determining whether the camber angle of the wheel at a first of the at least one point in the revolution of the wheel is larger than a reference camber angle by a threshold value, the reference camber angle representing a camber angle of a wheel attached to a undefective axle.

* * * * *